US011127202B2

(12) United States Patent
Krishna

(10) Patent No.: US 11,127,202 B2
(45) Date of Patent: Sep. 21, 2021

(54) SEARCH AND RESCUE UNMANNED AERIAL SYSTEM

(71) Applicant: Parthiv Krishna, Tonka Bay, MN (US)

(72) Inventor: Parthiv Krishna, Tonka Bay, MN (US)

(73) Assignee: Parthiv Krishna, Los Gatos, CA (US)

( * ) Notice: Subject to any disclaimer, the term of this patent is extended or adjusted under 35 U.S.C. 154(b) by 212 days.

(21) Appl. No.: 16/113,962

(22) Filed: Aug. 27, 2018

(65) Prior Publication Data

US 2019/0188906 A1 Jun. 20, 2019

Related U.S. Application Data

(60) Provisional application No. 62/607,311, filed on Dec. 18, 2017.

(51) Int. Cl.
*G06T 17/05* (2011.01)
*G06T 7/73* (2017.01)
(Continued)

(52) U.S. Cl.
CPC .............. *G06T 17/05* (2013.01); *B64D 47/08* (2013.01); *G06K 9/0063* (2013.01);
(Continued)

(58) Field of Classification Search
CPC ...................................................... G06T 17/05
(Continued)

(56) References Cited

U.S. PATENT DOCUMENTS 8,442,307 B1  5/2013  Anati et al.
8,543,265 B2  9/2013  Ekhaguere et al.
(Continued)

FOREIGN PATENT DOCUMENTS

CA         167383 S      11/2016
CN         103941748      7/2014
(Continued)

OTHER PUBLICATIONS

NPL, Rosnell, T. et al., Point Cloud Generation from Aerial Image Data Acquired by a Quadrocopter Type Micro Unmanned Aerial Vehicle and a Digital Still Camera, Finnish Geodetic Institute, Geodeetinrinne 2, 02430 Masala, Finland, Sensors 2012.*
(Continued)

*Primary Examiner* — Jean Paul Cass
(74) *Attorney, Agent, or Firm* — Fish & Richardson P.C.

(57) ABSTRACT

The subject matter of this specification can be embodied in, among other things, a method that includes a computer-implemented method for creating three-dimensional models includes capturing, at a first location, a two-dimensional first image of a three-dimensional scene, capturing, at a second location, a two-dimensional second image of the three-dimensional scene, measuring a range distance from at least one of the first location and the second location to a closest object in the scene, determining a depth map based on differences between the first image and the second image, determining a three-dimensional point cloud based on the range distance, the depth map, and at least one of the first image and the second image, and providing the three-dimensional point cloud as a three-dimensional model of the three-dimensional scene.

14 Claims, 11 Drawing Sheets

(51) Int. Cl.
| | |
|---|---|
| G08G 5/00 | (2006.01) |
| G06T 7/55 | (2017.01) |
| B64D 47/08 | (2006.01) |
| G06K 9/00 | (2006.01) |
| G06T 17/00 | (2006.01) |
| G06K 9/62 | (2006.01) |
| G06T 7/90 | (2017.01) |
| B64C 39/02 | (2006.01) |

(52) U.S. Cl.
CPC ............ *G06K 9/6218* (2013.01); *G06T 7/55* (2017.01); *G06T 7/75* (2017.01); *G06T 17/00* (2013.01); *G08G 5/0013* (2013.01); *G08G 5/0034* (2013.01); *G08G 5/0069* (2013.01); *G08G 5/0086* (2013.01); *B64C 39/024* (2013.01); *B64C 2201/024* (2013.01); *B64C 2201/123* (2013.01); *B64C 2201/127* (2013.01); *B64C 2201/146* (2013.01); *G06T 7/90* (2017.01); *G06T 2207/10004* (2013.01); *G06T 2207/10028* (2013.01); *G06T 2207/10032* (2013.01); *G06T 2207/30241* (2013.01); *G06T 2207/30252* (2013.01)

(58) Field of Classification Search
USPC ........................................................ 701/528
See application file for complete search history.

(56) References Cited

U.S. PATENT DOCUMENTS

| | | | | |
|---|---|---|---|---|
| 9,383,753 | B1* | 7/2016 | Templeton | ............... G01S 17/42 |
| 10,008,035 | B1* | 6/2018 | Redden | ...................... G06T 7/74 |
| 2009/0076665 | A1* | 3/2009 | Hoisington | .......... G05D 1/0044 |
| | | | | 701/2 |
| 2013/0096873 | A1* | 4/2013 | Rosengaus | ........... G01C 15/002 |
| | | | | 702/151 |
| 2016/0140851 | A1 | 5/2016 | Levy et al. | |
| 2016/0307449 | A1 | 10/2016 | Gordon et al. | |
| 2017/0039765 | A1* | 2/2017 | Zhou | .......................... G06T 7/55 |
| 2018/0094935 | A1 | 4/2018 | O'Brien et al. | |
| 2018/0350086 | A1* | 12/2018 | Sweet, III | ............... G05D 1/102 |
| 2019/0050000 | A1* | 2/2019 | Kennedy | .................. G06T 7/277 |
| 2019/0188906 | A1* | 6/2019 | Krishna | ................ G08G 5/0069 |
| 2020/0066034 | A1* | 2/2020 | Tham | ........................ G06T 17/05 |

FOREIGN PATENT DOCUMENTS

| | | | | |
|---|---|---|---|---|
| CN | 106325295 | | 1/2017 | |
| CN | 106846485 | | 6/2017 | |
| EP | 2884305 | A1 | 6/2015 | |
| EP | 2942688 | A1 * | 11/2015 | ............ G05D 1/104 |
| FR | 3006296 | | 12/2014 | |
| KR | 20180049608 | | 5/2018 | |
| KR | 101886013 | B1 * | 8/2018 | ........... G05D 1/0094 |

OTHER PUBLICATIONS

Google Machine Translation of European Patent Application Pub. No. EP2942688A1 t Buys et al. (downloaded on Jun. 1, 2020).*
Google Machine Translation of KOREAN Patent Application Pub. No. KR 101886013 b1.*
Akyildiz et al., "Wireless Mesh Networks: A Survey," Computer Networks, 47, 445-487, dated Jan. 1, 2005, 43 pages.
Bailey et al., "Simultaneous Localisation and Mapping (SLAM): Part I The Essential Algorithms," IEEE, dated Jun. 2006, 9 pages.
Bailey et al., "Simultaneous Localisation and Mapping (SLAM):Part II State of the Art," IEEE, dated Sep. 2006, 10 pages.
Boushaba et al., "Local Node Stability-Based Routing for Wireless Mesh Networks," IEEE Wireless Communications and Netowrking Conference (WCNC), dated Apr. 2013, 6 pages.
Brown et al., "Ad Hoc UAV Ground Network (AUGNet)," AIAA 3rd "Unmanned Unlimited" Technical Conference, Workshop and Exhibit, year 2004, 11 pages.
Colomina et al., "Unmanned aerial systems for photogrammety and remote sensing: A review," ISPRS Journal of Photogrammetry and Remote Sensing, 92, 79-97, dated Feb. 16, 2014, 19 pages.
Goncalves, et al., "UAV photogrammetry for topographic monitoring of coastal areas," ISPRS Journal of Photogrammetry and Remote Sensing, 104, 101-111, dated Feb. 15, 2015, 11 pages.
Guo et al., "Resource-Aware Large-Scale Cooperative 3D Mapping from Multiple Cell Phones," ICRA Late Breaking Results Poster, 26-30, year 2015, 1 page.
IEEE Computer Society. (2016). Local and metropolitan area networks—Part 11: Wireless LAN Medium AccessControl (MAC) and Physical Layer (PHY) Specifications. doi:10.1109/ieeestd.2012. 6361248, pp. 246-261 and 2163-2194, dated Dec. 7, 2016, 48 pages.
Ming et al., "Generation of Dense 3D Point Clouds Using a Small Quadcopter," Geomatica, 68(4), 319-330, dated Dec. 2014, 11 pages.
Lin, W. "Distributed UAV formation control using differential game approach," Aerospace Science and Technology, 35, 54-62, dated Mar. 12, 2014, 10 pages.
Mahmood et al., "Search-based routing in wireless mesh network," EURASIP Journal on Wireless Communications and Networking, dated Dec. 2017, 15 pages
Michael et al., "Collaborative Mapping of an Earthquake Damaged Building via Ground and Aerial Robots," Springer Tracts in Advanced Robotics Field and Service Robotics, 33-47, dated Aug. 14, 2012, 10 pages.
Pojda et al., "Performance analysis of mesh routing protocols for UAV swanning applications," 8th International Symposium on Wireless Communication Systems, dated Nov. 2011, 5 pages.
Qiu, et al. " Multiple UAV distributed close formation control based on in-flight leadership hierarchies of pigeon flocks," Aerospace Science and Technology, dated Aug. 21, 2017, 16 pages.
Rudol et al., "Human Body Detection and Geolocalization for UAV Search and Rescue Missions Using Color and Thermal Imagery," IEEE Aerospace Conference, year 2008, 8 pages.
Thrun et al., "Simultaneous Localization and Mapping," Springer Handbook of Robotics, 871-889 year 2008, 19 pages.
Wang et al., "Dynamics modelling and linear control of quadcopter," International Conference on Advanced Mechatronic Systems, dated Dec. 3, 2016, 6 pages.

* cited by examiner

SEARCH AND RESCUE UNMANNED AERIAL SYSTEM

CROSS REFERENCE TO RELATED APPLICATION(S)

This application claims the benefit of priority to U.S. Provisional Patent Application Ser. No. 62/607,311, filed Dec. 18, 2017, the contents of which are hereby incorporated by reference.

TECHNICAL FIELD

This instant specification relates to unmanned aerial vehicles configured for environmental mapping.

BACKGROUND

An unmanned aerial vehicle (UAV), commonly known as a "drone", is an aircraft without a human pilot aboard. UAVs generally include at least some degree of autonomy in their flight controls, ranging from features that simplify remote piloting (e.g., stabilization, position holding, obstacle avoidance) to fully automatic flight. UAVs are commonly used for tasks that are too expensive or dangerous for humans to perform, such as aerial photography or remote surveillance. An unmanned aerial system (UAS) generally includes one or more UAVs, a remote (e.g., ground-based) controller, and a system of communications between the two.

SUMMARY

In general, this document describes unmanned aerial vehicles configured and used for three-dimensional environmental mapping.

In a first aspect, a computer-implemented method for creating three-dimensional models includes capturing, at a first location, a two-dimensional first image of a three-dimensional scene, capturing, at a second location, a two-dimensional second image of the three-dimensional scene, measuring a range distance from at least one of the first location and the second location to a closest object in the scene, determining a depth map based on differences between the first image and the second image, determining a three-dimensional point cloud based on the range distance, the depth map, and at least one of the first image and the second image, and providing the three-dimensional point cloud as a three-dimensional model of the three-dimensional scene.

Various implementations can include some, all, or none of the following features. The method can also include capturing, at a third location, a two-dimensional third image of the three-dimensional scene, measuring a second range distance between the third location and another closest object in the scene, determining a second depth map based on differences between the third image and one of the first image and the second image, determining a second three-dimensional point cloud based on the second range distance, the second depth map, and the third image, and expanding the three-dimensional model based on the second three-dimensional point cloud. Capturing the first two-dimensional image can include capturing, by an image sensor positioned at the first location by an unmanned aerial system (UAS), the first two-dimensional image, capturing the second two-dimensional image comprises capturing, by the image sensor positioned at the second location by the UAS, the second two-dimensional image, and measuring the range distance comprises measuring, by a range sensor positioned by the UAS, the range distance. Capturing the first two-dimensional image can include capturing, by a first image sensor positioned at the first location by a first unmanned aerial system (UAS), the first two-dimensional image, capturing the second two-dimensional image comprises capturing, by a second image sensor positioned at the second location by a second UAS, the second two-dimensional image, and measuring the range distance comprises measuring, by a range sensor positioned by the first UAS or the second UAS, the range distance. Determining a three-dimensional point cloud can include determining a two-dimensional collection of difference values by comparing the first image and the second image, grouping the difference values into subsets of points having similar difference values, identifying a subset from the grouped subsets, associating the range depth with the identified subset, determining depths of other subsets of points based on an extrapolation of the depth, the difference values of the identified subset, and the difference values of the other subsets, and creating the three-dimensional point cloud based on the determined depths. The method can also include, for one or more difference values in the collection of depths, selecting the difference value, determine the two-dimensional location of the selected difference value, identify a two-dimensional location in least one of the first image and the second image that corresponds to the determined two-dimensional location, identify one or more image characteristics of the identified location, wherein the image characteristics are selected from a group comprising color values and luminance values, and associating the identified image characteristic and the selected difference value with the determined two-dimensional location, wherein creating the three-dimensional point cloud based on the determined depths is further based on the image characteristics and the selected difference values associated with the determined two-dimensional locations, such that one or more points of the point cloud each have a three dimensional position and one or more image characteristics. The method can also include determining a flight path based on the three-dimensional model, and navigating an unmanned aerial system based on the determined flight path. The method can also include identifying a portion of the three-dimensional point cloud having a relatively lower point density than other portions of the three-dimensional point cloud, and identifying a three-dimensional location based on the identified portion, wherein the flight path includes the identified three-dimensional location. The method can also include capturing, at the identified three-dimensional location, a two-dimensional third image of the three-dimensional scene, measuring a second range distance between the identified three-dimensional location and another closest object in the scene, determining a second depth map based on differences between the third image and one of the first image and the second image, determining a second three-dimensional point cloud based on the second range distance, the second depth map, and the third image, and increasing the point density of the three-dimensional point cloud based on the second three-dimensional point cloud.

In a second aspect, an unmanned aerial system (UAS) includes a processing system, an image sensor, a range sensor, a lifting system comprising one or more lifting mechanisms configured to be controlled by the processor, and a non-transitory computer-readable medium coupled to the processing system and having instructions stored thereon that, when executed by the processing system, cause the UAS to perform operations including positioning, by the lifting system, the UAS to a three-dimensional first location, capturing, by the image sensor at the first location, a two-dimensional first image of a three-dimensional scene, positioning, by the lifting system, the UAS at a three-dimensional second location, capturing, by the image sensor at the second location, a two-dimensional second image of the three-dimensional scene, measuring, based on range signals provided by the range sensor, a range distance from at least one of the first location and the second location to a closest object in the scene, determining a depth map based on differences between the first image and the second image, determining a three-dimensional point cloud based on the range distance, the depth map, and at least one of the first image and the second image, and providing the three-dimensional point cloud as a three-dimensional model of the three-goo dimensional scene.

Various embodiments can include some, all, or none of the following features. The operations can also include capturing, at a third location, a two-dimensional third image of the three-dimensional scene, measuring a second range distance between the third location and another closest object in the scene, determining a second depth map based on differences between the third image and one of the first image and the second image, determining a second three-dimensional point cloud based on the second range distance, the second depth map, and the third image, and expanding the three-dimensional model based on the second three-dimensional point cloud. Determining a three-dimensional point cloud can include determining a two-dimensional collection of difference values by comparing the first image and the second image, grouping the difference values into subsets of points having similar difference values, identifying a subset from the grouped subsets, associating the range depth with the identified subset, determining depths of other subsets of points based on an extrapolation of the range depth, the difference values of the identified subset, and the difference values of the other subsets, and creating the three-dimensional point cloud based on the determined depths. The operations can also include, for one or more difference values in the collection of depths, selecting the difference value, determine the two-dimensional location of the selected difference value, identify a two-dimensional location in least one of the first image and the second image that corresponds to the determined two-dimensional location, identify one or more image characteristics of the identified location, wherein the image characteristics are selected from a group comprising color values and luminance values, and applying the identified image characteristic to the selected difference value, wherein creating the three-dimensional point cloud based on the determined depths is further based on the image characteristics applied to the difference values, such that one or more points of the point cloud each have three dimensional position and one or more image characteristics. The operations can also include determining a flight path based on the three-dimensional model, and navigating the UAS based on the determined flight path. The operations can also include identifying a portion of the three-dimensional point cloud having a relatively lower point density than other portions of the three-dimensional point cloud, and identifying a three-dimensional location based on the identified portion, wherein the flight path includes the identified three-dimensional location. The operations can also include capturing, by the image sensor at the identified three-dimensional location, a two-dimensional third image of the three-dimensional scene, measuring, based on second range signals provided by the range sensor, a second range distance between the identified three-dimensional location and another closest object in the scene, determining a second depth map based on differences between the third image and one of the first image and the second image, determining a second three-dimensional point cloud based on the second range distance, the second depth map, and the third image, and increasing the point density of the three-dimensional point cloud based on the second three-dimensional point cloud. The UAS can also include a communications transceiver, wherein the operations can also include transmitting, by the communications transceiver, at least one of the first image, position information of the first location, the second image, position information of the second location, the range distance, the depth map, and the three dimensional point cloud to a computer system that is separate from the UAS, and processing, by the computer system, at least one of the first image, position information of the first location, the second image, position information of the second location, the range distance, the depth map, and the three dimensional point cloud to determine the three-dimensional model. The operations can also include receiving, by the communications transceiver, the three-dimensional model, determining a flight path based on the received three-dimensional model, and navigating the UAS based on the determined flight path.

In a third aspect, a system for creating full-color three-dimensional models includes a first unmanned aerial system (UAS) and a second UAS, each UAS having a processing system, an image sensor, a range sensor, a communications transceiver system, a lifting system having one or more lifting mechanisms configured to be controlled by the processor, a non-transitory computer-readable medium coupled to the processing system and having instructions stored thereon that, when executed by the processing system, cause the first UAS to perform operations including positioning, by the lifting system, the first UAS to a three-dimensional first location, capturing, by the image sensor at the first location, a two-dimensional first image of a three-dimensional scene, transmitting, by the communications transceiver, the first image and information descriptive of the first location to the second UAS, and cause the second UAS to perform operations including receiving, by the communications transceiver, the first image and information descriptive of the first location, positioning, by the lifting system, the second UAS to a three-dimensional second location, capturing, by the image sensor at the location, a two-dimensional second image of the three-dimensional scene, measuring, based on range signals provided by the range sensor, a range distance from the second location to a closest object in the scene, determining a depth map based on differences between the first image and the second image, determining a three-dimensional point cloud based on the range distance, the depth map, and at least one of the first image and the second image, and providing the three-dimensional point cloud as a three-dimensional model of the three-dimensional scene.

In a fourth aspect, a system for creating full-color three-dimensional models includes at least one unmanned aerial system (UAS) having a first processing system, an image sensor, a range sensor, a first communications transceiver system, a lifting system having one or more lifting mechanisms configured to be controlled by the processor, a first non-transitory computer-readable medium coupled to the first processing system and having instructions stored thereon that, when executed by the first processing system, cause the UAS to perform first operations including positioning, by the lifting system, the UAS to three-dimensional locations, capturing, by the image sensor at the locations, two-dimensional images of a three-dimensional scene, measuring, based on range signals provided by the range sensor, range distances from the locations to closest objects in the scene, and transmitting, by the first communications transceiver, the images, the range distances, and information descriptive of the locations, and a computing system having a second processing system, a second communications transceiver system, a second non-transitory computer-readable medium coupled to the second processing system and having instructions stored thereon that, when executed by the first processing system, cause the computer system to perform second operations including receiving, by the communications transceiver, a first image and information descriptive of a first location, receiving, by the communications transceiver, a second image and information descriptive of a second location, receiving, by the communications transceiver, a range distance from one of the first location and the second location to the a closest object in the scene, determining a depth map based on differences between the first image and the second image, determining a three-dimensional point cloud based on the range distance, the depth map, and at least one of the first image and the second image, and providing the three-dimensional point cloud as a three-dimensional model of the three-dimensional scene.

Various embodiments can include some, all, or none of the following features. The second operations can also include transmitting, by the second communications transceiver system, the three-dimensional model, and the first operations can also include receiving, by the first communications transceiver system, the three-dimensional model, determining a flight path based on the received three-dimensional model, and navigating the UAS based on the determined flight path.

The systems and techniques described here may provide one or more of the following advantages. First, a system can three-dimensional maps of an environment to human operators. Second, the system can show the 3D locations of objects, people, walls, doors, and other features. Third, the system can provide 3D maps in various spectra, including visible, ultraviolet, infrared, combinations of these, or others. Fourth, the system can provide 3D maps with little human input. Fifth, the system can provide the aforementioned advantages with relatively fewer moving parts and/or at lower cost than current solutions.

The details of one or more implementations are set forth in the accompanying drawings and the description below. Other features and advantages will be apparent from the description and drawings, and from the claims.

DETAILED DESCRIPTION

This document describes systems and techniques for mapping three-dimensional (3D) environments using an unmanned aerial system (UAS). In very general terms that will be explained in more detail below, an unmanned aerial vehicle (UAV) can be directed to a selected location within a 3D environment, and take a picture. The UAV can then be directed to a slightly different vantage point, and take a second picture and measure a distance to a closest object in the picture. The two pictures can be compared to detect the degree of shift in objects in the scene. Closer objects will appear to shift proportionally more than more distant objects. Since the distance to the closest object was measured, the distances to other objects can be determined proportional to their shifts. Color or other image information from one of the pictures can be combined with the determined distances to create a 3D color model of the scene.

In use, the example UAS can be used in search and rescue operations. For example, a fire department can send a single UAV or a swarm of cooperative UAVs into a burning building to capture multiple sets of 3D images (e.g., color, infrared, thermal) that can be combined into a larger, realistic-looking 3D model of the inside of the building. Fire fighters can use such models to preview the hazardous environment, pre-locate victims in need of rescue, plan searches, etc. For example, the UAS can help fire fighters get to victims with less risk to the fire fighters (e.g., avoiding especially dangerous areas, reducing human exposure to perform surveillance and search) and/or in less time (e.g., bypassing unimportant rooms and going more directly to the location of need, avoiding dead ends).

Figure 1:
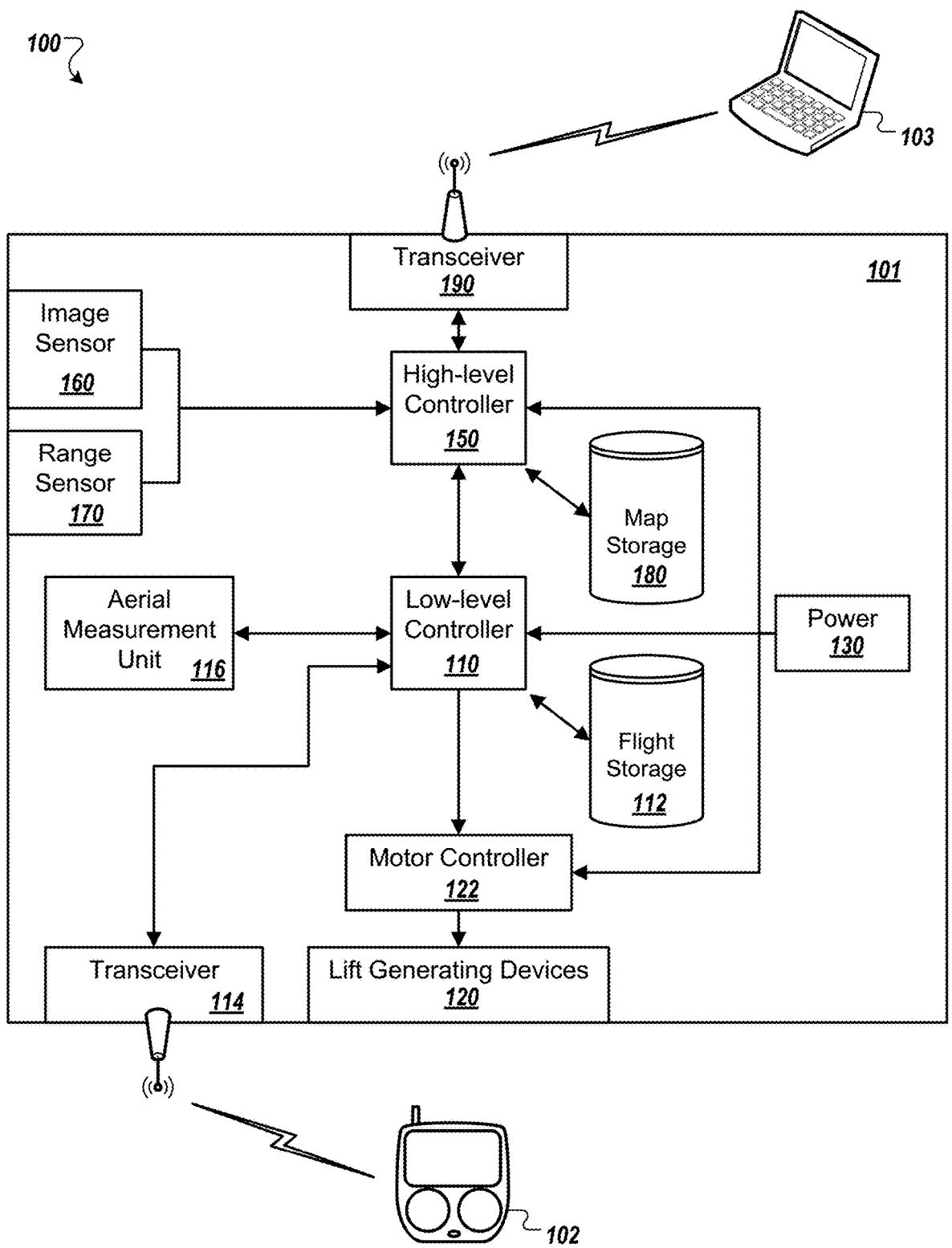
FIG. 1 is a block diagram of an example unmanned aerial system.

FIG. 1 is a block diagram of an example unmanned aerial system (UAS) 100. The terms "unmanned aerial system" and "UAS" can be used interchangeably with the terms "unmanned aerial vehicle" (UAV) and/or "drone" as they are also commonly called. In general, this document will use the term "unmanned aerial vehicle", "UAV", and/or "drone" to refer to a single flying apparatus, and use the term "unmanned aerial system" and/or "UAS" to refer to a collection of one or more UAVs and/or supporting equipment (e.g., remote controllers) used together in the operation of the UAVs.

Referring now to FIG. 1, the UAS 100 includes a UAV 101. The UAV 101 includes a low-level controller 110 and a high-level controller 150. In some embodiments, the functions of the low-level controller 100 and the high-level controller 150 can be performed by multiple processors, and in some other embodiments the functions can be performed on a shared processor. The low-level controller 110 includes one or more processors that can perform operations based on computer instructions and various forms of input and feedback, as will be described further below. The low-level processor 110 is communicatively connected to a flight data storage device 112. The flight data storage device 112 tangibly stores computer instructions that, when processed by the low-level controller 110, perform flight operations (e.g., controlling position and heading, power management, communications). The flight data storage device 112 also stores data that can be used during flight operations (e.g., maps, waypoints, calibration settings). The low-level controller 110 performs at least three general tasks: pose estimation, flight command reception, and lift control.

The low-level controller 110 is communicatively connected to a communications transceiver 114 for flight command reception. The communications transceiver 114 is configured to communicate (e.g., by digital or analog radio link) to a remote controller 102. In use, a human or automated operator uses the remote controller 102 to transmit flight instructions (e.g., pitch, yaw, roll, altitude, direction, speed) to the transceiver 114, and the low-level controller 110 uses those instructions as part of its flight control operations. The low-level controller 110 uses the transceiver 114 to provide feedback to the remote controller 102, such as position, power status, and system health information.

The low-level controller 110 also receives feedback from an aerial measurement unit (AMU) 116. The AMU 116 includes one or more devices for detecting the physical state of the UAV 101. For example, the AMU 116 can include one or more single or multiple axis accelerometers (e.g., inertial measurement units) that can be used to measure changes in position of the UAV 101. The AMU 116 can include local and/or global positioning systems (e.g., GPS, GLONASS) for identifying the absolute position of the UAV 101 (e.g., globally) or the relative position of the UAV 101 (e.g., relative to a "home" location or stationary transmitter system). The AMU 116 can include other measurement systems as well, such as compasses, gyroscopes, altimeters, thermometers, voltmeters, ammeters, optical flow sensors, and combinations of these and/or any other appropriate form of device that can provide feedback about UAV flight operations and/or conditions.

The pose of the UAV 101 includes the position and orientation of the UAV 101, and can be represented as a pair of three-element vectors:

$$\text{Position: } \xi = \begin{bmatrix} x \\ y \\ z \end{bmatrix}$$

and $$\text{Orientation: } \eta = \begin{bmatrix} \Phi \\ \theta \\ \varphi \end{bmatrix}$$

Position is the position of the UAV 101 (e.g., relative to the starting point, takeoff point, <0, 0, 0>). Orientation is the orientation of the UAV 101, relative to its initial orientation (e.g., <0, 0, 0>, starting out on a level surface and with a zero heading). <φ, θ, Ψ> are rotations around the <x, y, z> axes respectively (e.g., roll, pitch, yaw). These are intrinsic rotations (e.g., contrasted with extrinsic rotations).

Orientation can also be expressed as a quaternion:

$$q = \begin{bmatrix} q_0 \\ q_1 \\ q_2 \\ q_3 \end{bmatrix}$$

In some implementations, quaternions, which are an extension of the complex number system, can be used to eliminate some issues associated with calculating the absolute orientation of the UAV as a roll-pitch-yaw vector. In some examples, quaternions can be used to avoid a phenomenon called gimbal lock.

Pose estimation is performed to provide absolute orientation data for the UAV 101. However, since noise is generally present in sensor data, a process of repeatedly modeling the absolute orientation of the UAV 101 in space is implemented. First, three-dimensional angular acceleration data is collected from the AMU 116. This data is then integrated twice to generate an estimate for the angular position (quaternion) of the UAV 101. Using sensor fusion with a Linear Quadratic Estimator (Kalman Filter):

$$x_k = F_k x_{k-1} + B_k u_k + w_k$$

$$\text{Where: } B_k = \begin{bmatrix} -0.15 & -0.15 & 0.15 & 0.15 \\ -0.15 & 0.15 & 0.15 & 0.15 \\ -0.1 & 0.1 & -0.1 & 0.1 \end{bmatrix}$$

This data is combined with the data from the history of motor outputs to generate a more robust pose estimate that accounts for noise and inconsistencies in the data. Pose estimates are calculated using previous pose data, sensor data, and control input history. In this case, $x_k$ is the vector representing the current orientation of the UAV 101. $F_k$ is the state transition model, which in this case consists of angular acceleration data that has been twice-integrated. This state transition model is applied to the previous pose estimate, $x_{k-1}$. The control model, $B_k$, is derived from a UAV linear matrix model, such as a quadcopter linear matrix model, and is applied to the control input vector $u_k$. Finally, process noise, $w_k$, which is taken from a multivariate normal distribution with mean zero is applied to account for noise in the sensor data and system as a whole. This pose estimate is then used to level the UAV 101 during hover routines, or to follow flight trajectories. In some implementations, other pose estimation techniques, including an Extended Kalman Filter, Unscented Kalman Filter, or machine learning-based approaches may be used.

Actual flight is achieved by a collection of lift-generating devices 120, such as motor/propeller combinations or jet turbines. Power for the lift-generating devices 120 is provided by a power system 130 (e.g., a battery, a fuel tank) that also provides power to the other subsystems of the UAV 101. Power to the lift-generating devices 120 is controlled by a motor controller 122 configured to receive commands from, and provide feedback to, the low-level controller 110.

The high-level controller 150 is in communication with the low-level controller 110, and includes one or more processors and electronic memory systems that tangibly store computer instructions that, when performed by the processor(s), perform high-level functions of the UAV 101. The high-level controller 150 is in communication with an image sensor 160 and a range sensor 170.

The image sensor 160 is configured to capture visual information as data (e.g., a digital camera). In the illustrated embodiment, the image sensor 160 is a form of color digital camera system that can capture a two-dimensional (2D) image of a scene and convert that image into data that is provided to the high-level controller 150. In some embodiments, the image sensor 160 can sense all or a portion of the visible light spectrum, ultraviolet, infrared (e.g., thermal vision, night vision), luminance only (e.g., greyscale), or combinations of these and/or any other appropriate form of imaging (e.g., x-rays). In some embodiments, the image sensor 160 can also include one or more illuminators (e.g., headlights, flashes) and/or light amplifiers (e.g., night vision). In use, the image sensor 160 captures images of scenes near (e.g., in front of) the UAV 101.

The range sensor 170 is configured to measure distances to solid objects and provide that measurement as data to the high-level controller 150. In some embodiments, the range sensor 170 can be a sonic or ultrasonic rangefinder. In some embodiments, the range sensor 170 can be a laser or other optical rangefinder. In use, the range sensor 170 measures the distance from the UAV 101 to one or more objects in the scene near (e.g., in front of) the UAV 101, such as the scene captured by the image sensor 160.

The high-level controller 150 is configured to process image data from the image sensor 160 and distance measurements from the range sensor 170 to create a three-dimensional (3D) model of the scene. This process will be discussed in detail in the descriptions of FIGS. 3-10. The high-level controller 150 stores the 3D model in a 370 map storage device 180 (e.g., a computer memory, a FLASH memory, a disk drive).

The high-level controller 150 is in data communication with a transceiver 190. The transceiver 190 provides wireless communications with a remote terminal 103. In some embodiments, the high-level controller 150 can provide 3D maps to the remote terminal 103 (e.g., for remote viewing). In some embodiments, the high-level controller 150 can provide raw or partly processed sensor information to the remote terminal 103. For example, the UAV 101 can transmit image, range, and positional information to the remote terminal 103, and the remote terminal 103 can process the data into the 3D map. Such examples can offload the process of building the map from the high-level processor 150 to the remote terminal 103 (e.g., which may have greater processing power and/or storage). Information (e.g., maps) can be transmitted from the remote terminal 103 to the UAV 101 for storage in the map storage device 180 as well.

Figure 2:
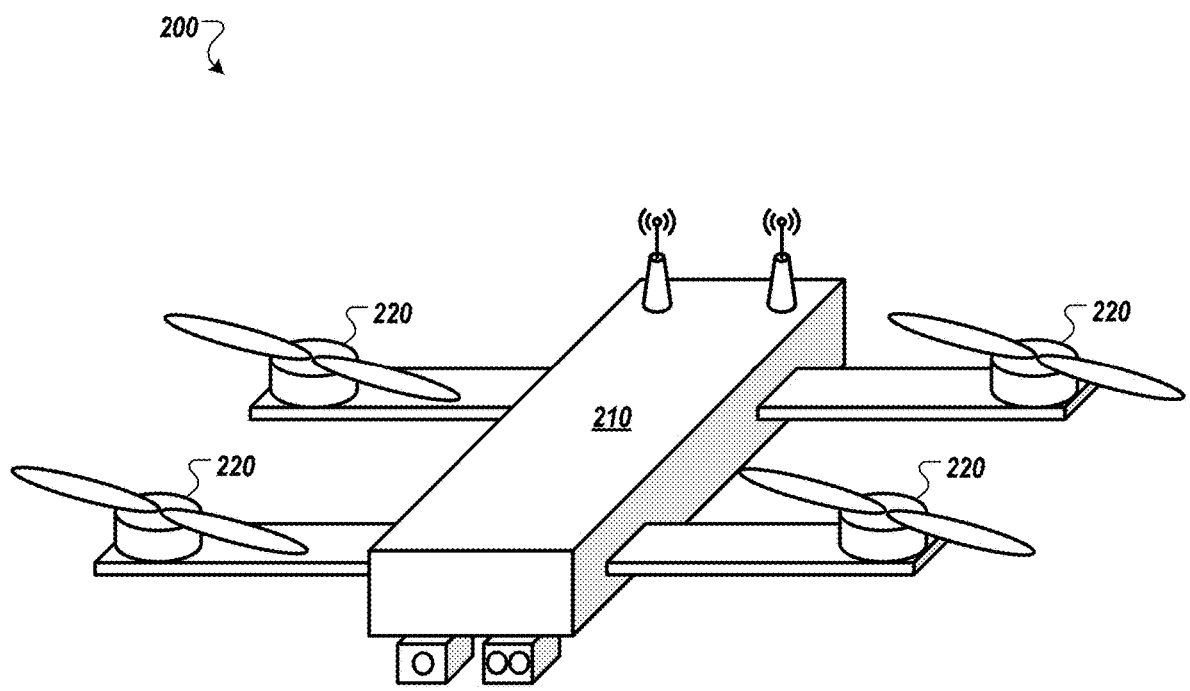
FIG. 2 shows an example unmanned aerial vehicle.

FIG. 2 shows an example unmanned aerial vehicle 200. In some embodiments, the UAV 200 can be the example UAV 101 of FIG. 1. The UAV 200 includes a main fuselage 210 that supports four lift-generating devices 220 (e.g., motor-propeller pairs). An image sensor 260 and a range sensor 270 are supported by the main fuselage 210, and are oriented in the same general direction. Information collected through the image sensor 260, the range sensor 270, and aerial measurement units (not shown) is processed by a high-level controller (not shown) that is housed within the main airframe 210.

The UAV 200 has a transceiver 214 configured to receive flight commands from a remote controller (e.g., the remote controller 102) and transmit flight feedback information to the remote controller. The UAV 200 has a transceiver 290 configured to provide 3D map data, processed sensor data, and/or raw sensor data to a remote terminal (e.g., remote terminal 103), and/or receive 3D map data from the remote terminal.

Although the UAV 200 is depicted as a quadcopter, in other embodiments it can be configured with more lift generating devices 220 (e.g., hexacopter, octacopter), fewer lift generating devices (e.g., tricopter, single or dual-rotor helicopter), tiltrotors, jets, rockets, lighter-than-air lifters (e.g., dirigible), variable wings (e.g., ornithopter), fixed wings, or combinations of these and/or any other appropriate form of lift-generating system(s) that can be used with a UAV.

Figure 3:
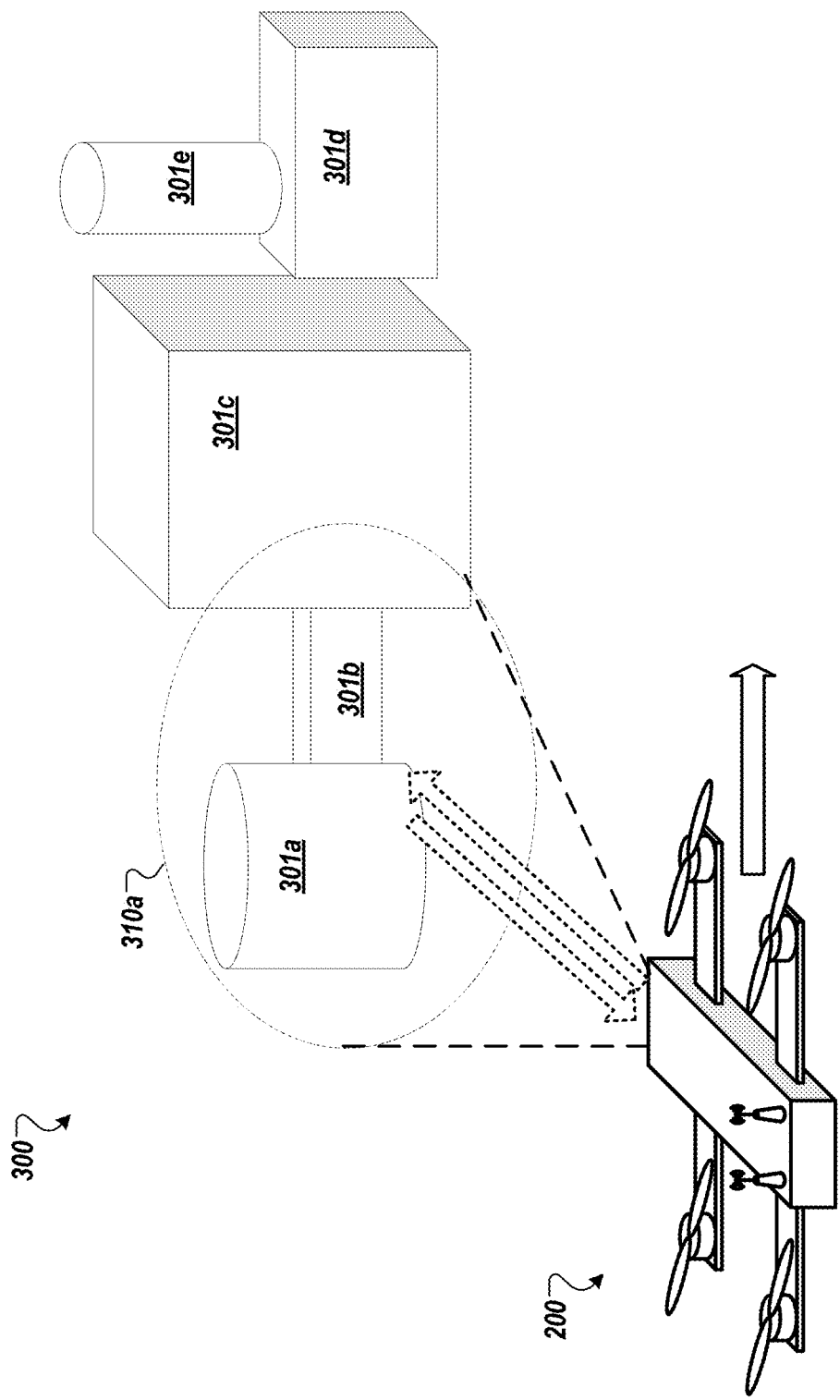
FIGS. 3 and 4 show an example unmanned aerial vehicle in a three-dimensional environment.
Figure 4:
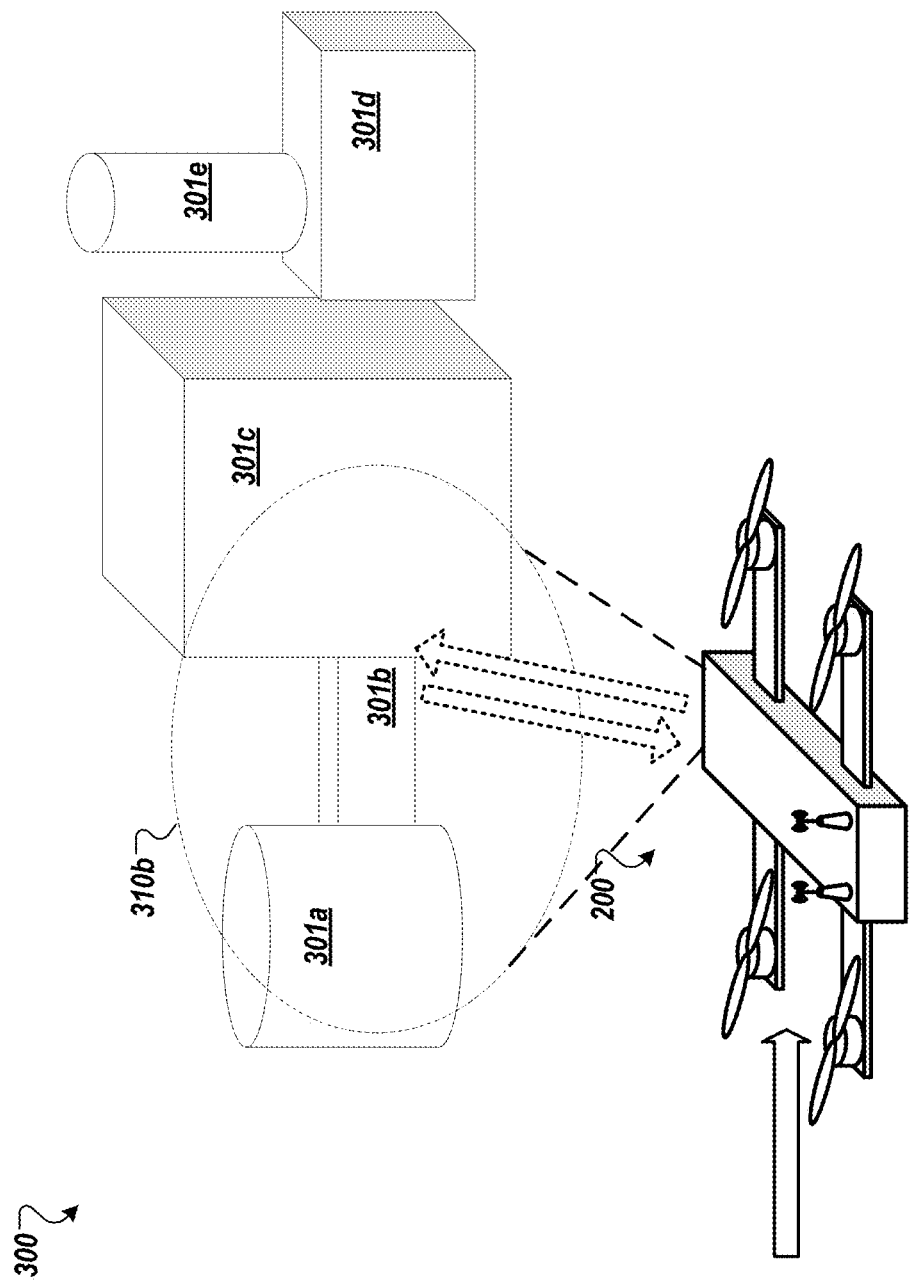

FIGS. 3 and 4 show the example unmanned aerial vehicle 200 of FIG. 2 in an example three-dimensional environment 300. The 3D environment 300 includes a number of 3D objects 301a-301e. In the illustrated examples, the objects 301a-301e are simple shapes that represent more complex objects, such as walls, furniture, stairs, window openings, desks, countertops, rocks, plants, another any other appropriate physical object. In use, the UAV 200 is flown, autonomously or remotely, to a first position in the 3D environment 300, as shown in FIG. 3.

In the first position, the UAV 200 uses the image sensor 260 (not visible in these views) to capture a first digital image of the objects 301a-301e of a first portion of the 3D environment 300. This first portion is represented by the scene 310a. The UAV 200 also uses the range sensor 270 (not visible in these views) to measure one or more distances from the UAV 200 to the objects 301a-301c. As will be explained further in the discussion below, the range measurement generally represents the distance to the closest object in the scene 310a.

Referring now to FIG. 4, the UAV 200 has been flown or otherwise repositioned, autonomously or remotely, to a second position in the 3D environment 300. In the second position, the UAV 200 uses the image sensor 260 to capture a second digital image of the objects 301a-301e of a second, overlapping portion of the 3D environment 300. This second portion is represented by the scene 310b. The UAV 200 also uses the range sensor 270 to measure one or more distances from the UAV 200 to the objects 301a-301c. As will be explained further in the discussion below, the range measurement generally represents the distance to the closest object in the scene 310b. In some implementations, the UAV may take only a single distance measurement from one of the two positions.

Figure 5:
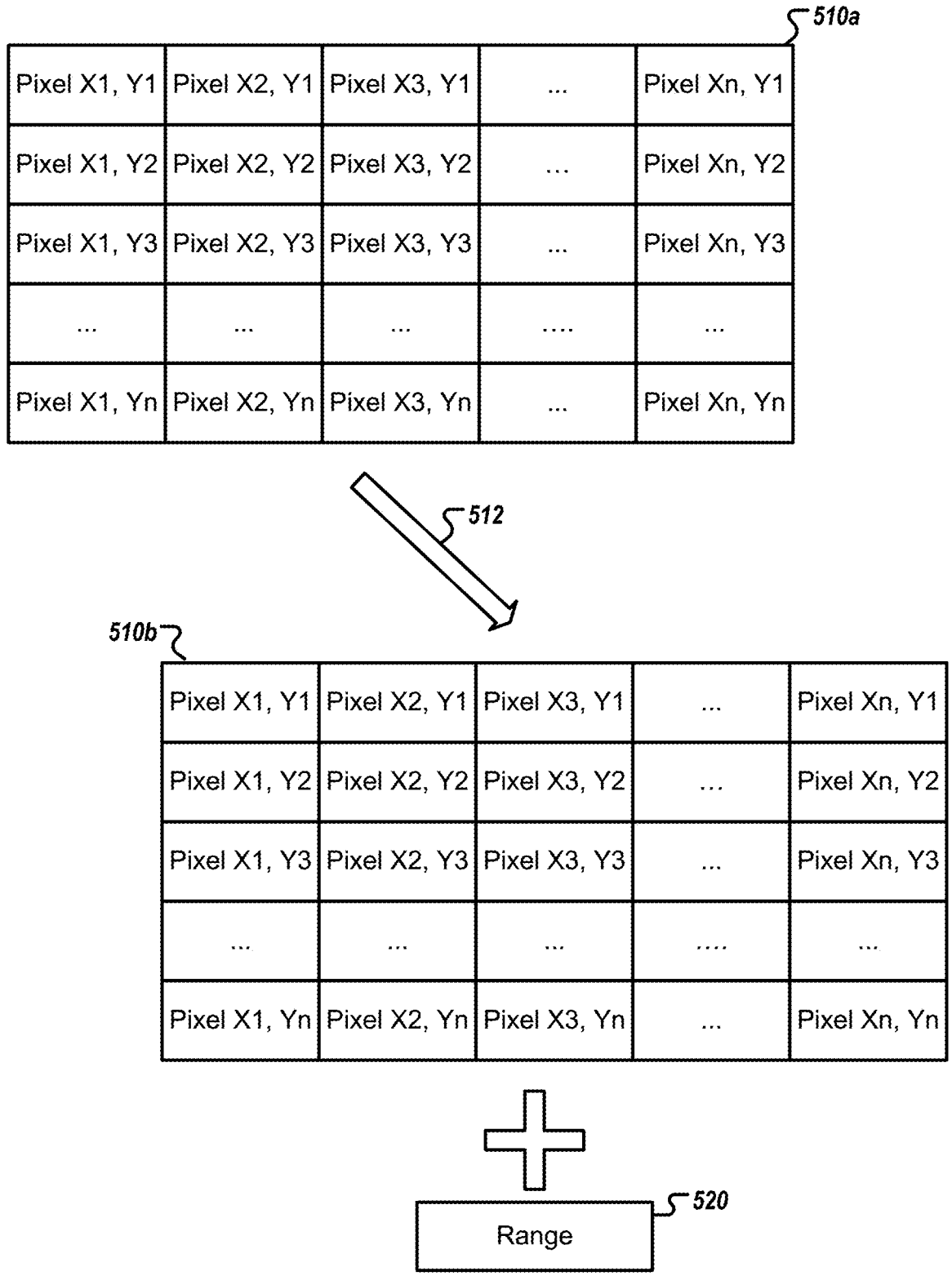
FIG. 5 shows a conceptual example of information collected by an unmanned aerial vehicle.

FIG. 5 shows a conceptual example of information collected by an unmanned aerial vehicle, such as the example UAV 101 of FIG. 1 or the example UAV 200 of FIG. 2. The example includes a pixel array 510a and a pixel array 510b. Each pixel in the image arrays 510a and 510b has a row (X) and column (Y) location.

In some implementations, a calibration process can be performed before using the UAV 101 for 3D capture operations, in order to account for image distortion. For example, the image sensor can be calibrated by capturing an image of a known checkerboard pattern, analyzing the captured image based on the known information to determine one or more correction matrices, and reference those matrices whenever future images are captured. In some implementations, since the hardware generally does not change during use of the UAV 101, the distortions can remain generally constant.

The pixel array 510a represents a first image of a 3D scene captured by a UAV (e.g., the image of the scene 310a). The UAV is then moved, as represented by arrow 512, to a second (e.g., offset) position. The pixel array 510b represents a second image of the 3D scene captured by the UAV from the offset position relative to the first image (e.g., the image of the scene 310b). A range measurement 520 is also taken from the second position.

Figure 6:
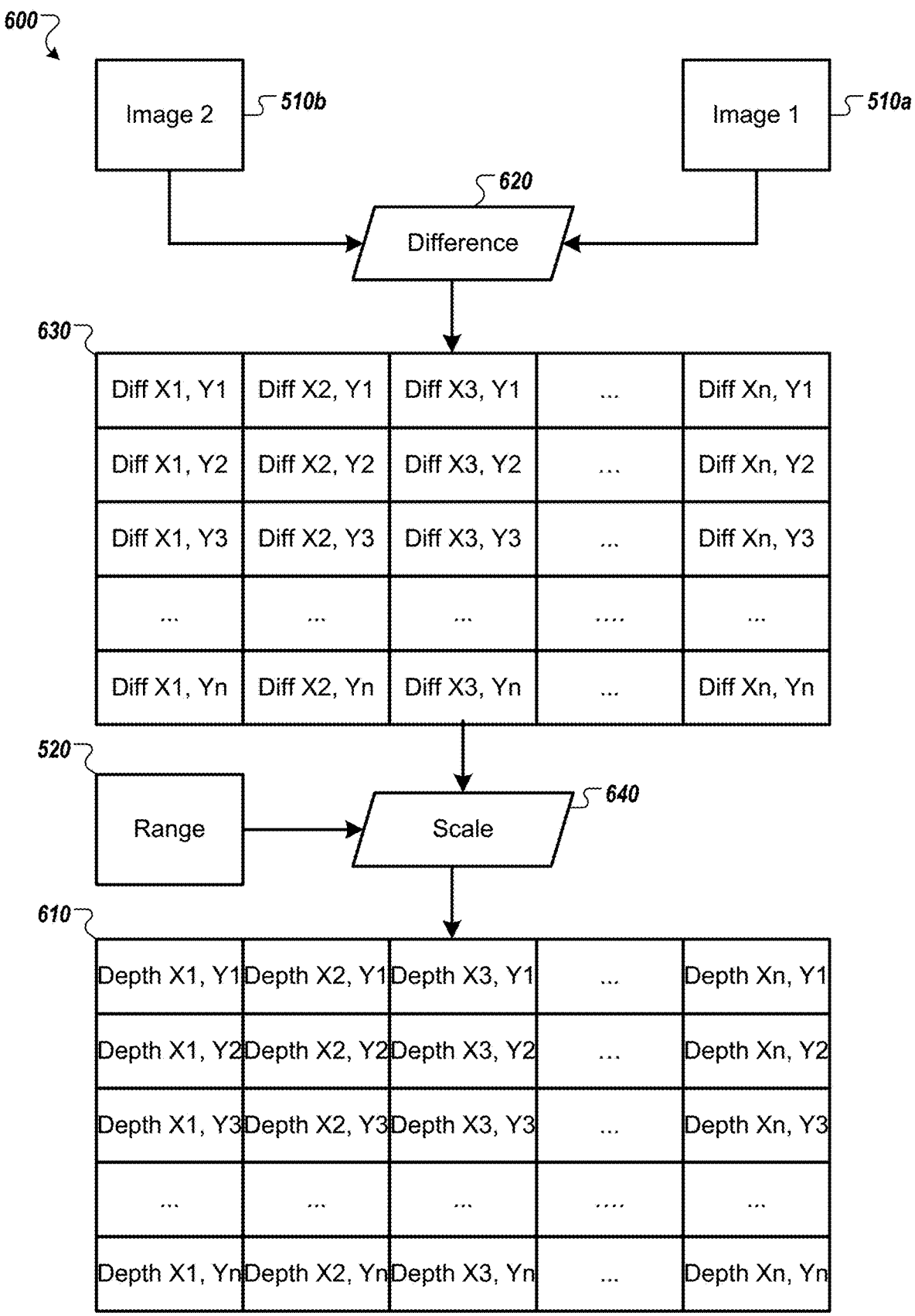
FIG. 6 shows a conceptual example of data operations for determining an example depth map.

FIG. 6 shows a conceptual example of data operations 600 for determining an example depth map 610 (or "point cloud"). In general, the depth map 610 is a 2D array of range values. In the illustrated example, each of the range values corresponds to a pixel location in the second image 510b.

The first image 510a and the second image 510b are compared in a difference process 620. In the difference process 620, the UAV or the UAS compares differences between the two captured images 510a and 510b to determine a difference array 630. The difference array 630 is a 2D array of difference values. In the illustrated example, each of the difference values corresponds to a pixel location in the second image 510b.

The first image 510a and the second image 510b is processed as a pair using a Semi-Global Block Matching (SGBM) process to generate depth maps, treating them as though they to matched pairs from a stereo camera. In some implementations, other techniques may be used, such as Scale-Invariant Feature Transformation (SIFT) or Speeded Up Robust Features (SURF), to match images. The process locates corners and edges within the images using Gaussian blurs to remove inconsistencies. Then, the process matches the detected corners and edges between the two images, and calculates how far each corner or edge moved between the two images 510a and 510b.

The process identifies epipolar lines (e.g., since the images have already been undistorted, these are just straight lines). Along these lines, the process identifies matching blocks of pixels (e.g., 3×3 blocks), especially corners and edges. A cost function compares various line angles to find the one that includes the most matched blocks. Then, the pixel coordinates of matched blocks are compared to estimate depths.

Pixels that move further between the two images 510a, 510b are considered to be closer to the UAV, while groups of pixels that move less are considered to be further away, which is a consequence of the parallax effect. The parallax effect that is leveraged in the implementation of the SGBM process determines relative distances among objects in the scene. For example, the process can determine that a certain group of pixels is three times further away than another group, but at this stage, it cannot determine the absolute distances.

As mentioned above, objects in the foreground of the images 510a, 510b will appear to have moved further proportionally further than objects in the background due to parallax. In the difference array 630, the magnitude of difference that is determined between the two images 510a, 510b for a given XY location is the difference value given for the corresponding XY location in the difference array 630.

Since the magnitudes of the difference values in the difference array 630 are proportional to the distances between the UAV and the objects in the captured image 510b, the difference values also indicate the relative distances from the UAV to the objects and/or objects represented by the pixels. At this point, only relative distances are known from the images.

The difference array 620 and the range measurement 520 are then provided to a scaling process 640. In the scaling process, the range measurement 520 is analyzed to determine an absolute distance to the closest object in the image 510b. This distance is associated with the location(s) in the difference array 620 having the greatest difference values.

Once an absolute distance value is known for one (or more) of the XY locations in the difference array 620, absolute distance values can be determined for the other XY locations in the difference array 620. Since the difference values are relative and proportional to each other, and represent distances that are proportionally further away from the known absolute distance to the closest foreground object, the absolute distances of the other XY locations can be extrapolated based on the range measurement 520. The resulting 2D array of absolute distances is provided as the depth map 610.

The depth map itself can be represented as a two-dimensional array of distance values, with each element containing the distance of the associated pixel. For example, the furthest object can be assigned a distance of 1, and all other objects can be assigned decimal values between 0 and 1.

$$rel = \begin{bmatrix} 0.321 & 0.281 & 0.949 & 0.101 \\ 0.391 & 0.532 & 0.191 & 0.932 \\ 0.371 & 0.134 & 1.000 & 0.294 \\ 0.371 & 0.134 & 1.000 & 0.452 \end{bmatrix}$$

Since each image is associated with a range measurement, which denotes the distance to the closest object, the relative distances can be converted into absolute distances. Conversion:

$$a(x,y) = r(x,y)/r(\min) \times a(\min)$$

Where:
$a(x,y)$=absolute distance at an arbitrary pixel (e.g., the value to be found).
$r(x,y)$=relative distance at an arbitrary pixel (e.g., from depth map).
$a(\min)$=absolute distance of closest point (e.g., from range measurement).
$r(\min)$=smallest relative distance from depth map.

Taking the previous example 4×4 array and converting it based on these equations, assuming 1 m for closest distance, the example result would be:

$$rel = \begin{bmatrix} 2.287 & 2.782 & 9.936 & 1.000 \\ 3.871 & 5.267 & 1.891 & 9.228 \\ 8.040 & 3.772 & 1.307 & 2.911 \\ 3.673 & 1.327 & 9.901 & 4.475 \end{bmatrix}$$

As an array of pixels with distances, this array needs to be converted this into actual points in space. Each captured image is a two-dimensional projection of the three-dimensional space. As a result, the (x,y) coordinates of a pixel cannot be directly correlated with the associated depth into an (x,y,z) point.

Instead, the (x,y) location of a pixel corresponds to two angles of incidence, a horizontal and a vertical one. Knowing the image sensor's field of view (e.g., 90 degree horizontal and 60 degree vertical) and the resolution of the images (e.g., 640×480), the (x,y) values of the pixels can be converted into ($\theta_h$, $\theta_v$).

$$\theta_h = \frac{x - 640/2}{90/2}$$

$$\theta_v = \frac{y - 480/2}{60/2}$$

At this point in the process, two angles and a distance (i.e., a point in a spherical coordinate system) have been determined. To convert this to the Cartesian (x,y,z) coordinate system, trigonometry is used. Here, r is the calculated distance, and $\theta_h$ and $\theta_v$ are the horizontal and vertical incidence angles.

$$x = r \sin \theta_v \cos \theta_h$$

$$y = r \sin \theta_v \sin \theta_h$$

$$z = r \cos \theta_v$$

Based on this information, the depth map can be converted into a scene point cloud. By cross-referencing the depth pixels with the original image pixels, color is also added into this point cloud. The x,y,z,R,G,B values are stored to be placed into the larger environment cloud.

Figure 7:
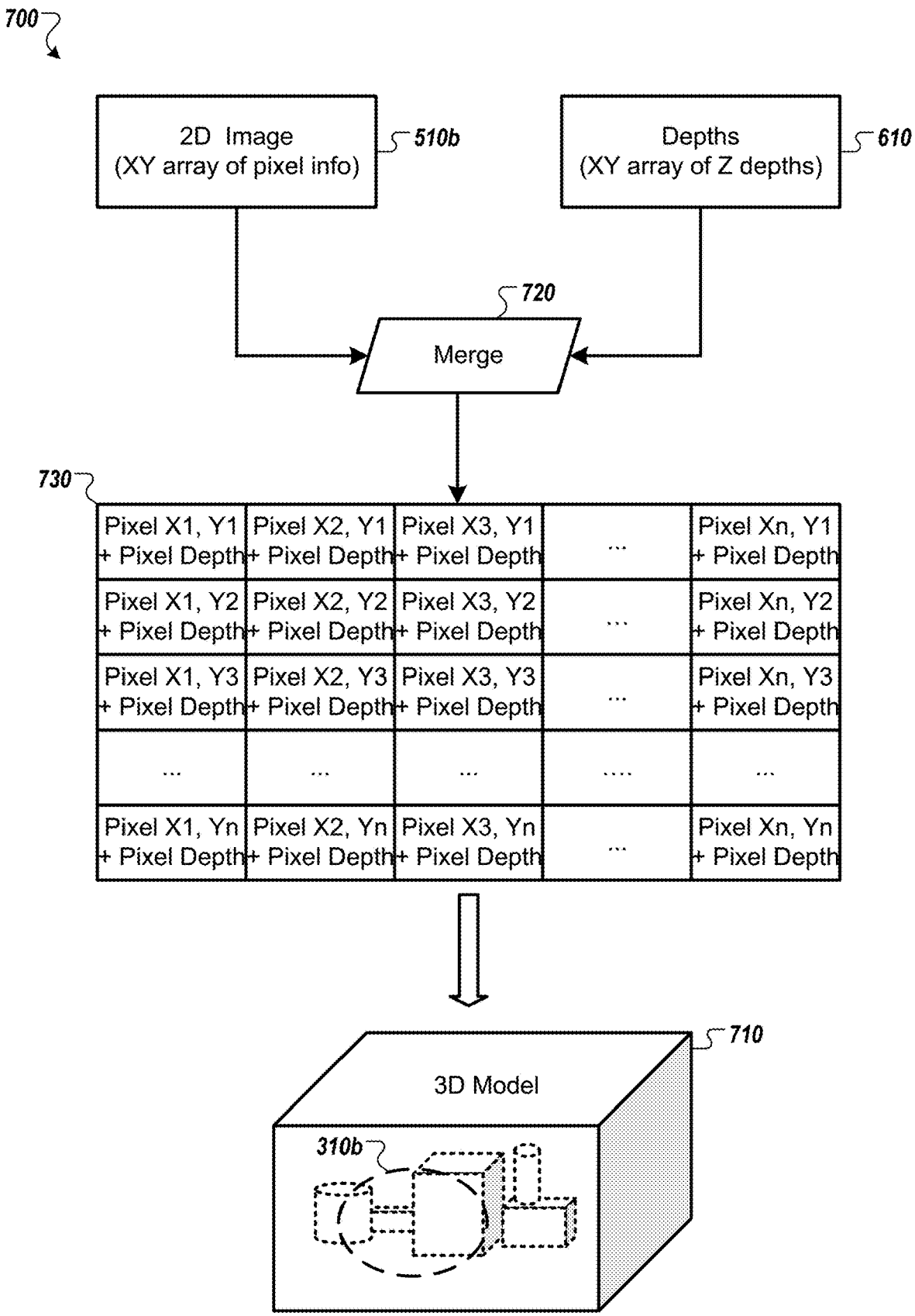
FIG. 7 shows a conceptual example of data operations for determining an example three-dimensional model.

FIG. 7 shows a conceptual example of data operations 700 for determining an example three-dimensional model 710. The depth map 610, by itself, is an array (e.g., XY) of distance values (e.g., Z) from the UAV to various points (e.g., pixels) in the image 510*b*. As such, the depth map 610 is a 2D (e.g., XY) collection of 3D coordinates (e.g., XYZ). In some implementations, a 3D model can be determined directly from the depth map 610. If such a model were to be represented visually, it would reveal shapes and surfaces of the scene captured in the image 510*b* (e.g., but not color).

In the illustrated example, the depth map 610 and the second image 510*b* are provided to a merging process 720. In general, a new 2D array is created in which each XY location stores a depth value from a corresponding XY location in the depth map 610, and one or more pixel values (e.g., red, green, blue, luminosity) from a corresponding XY location in the image 510*b*. The resulting 2D array of image (e.g., color) and depth values (sometimes called a "point cloud") is provided as a point array 730.

The point array 730 is processed (e.g., extruded) into a 3D array. For example, the depth value for each XY location can be transformed into a Z value, and for each 3D cell with a transformed Z value, the corresponding XY image value can be stored. The 3D array is then visualized or otherwise presented as the 3D model 710, in which the 3D array locations having image values (e.g., colors) are presented with those image values at their corresponding 3D positions, and the 3D array locations without image values are transparent. As such, the 3D model 710 has both depth and color to at least partly emulate the look and form of the scene 310*b*.

In order to perform environment reconstruction, a set of base axes is identified: X, Y, and Z (note capitalization). These coordinates are used as a base for the placement of the individual scene point clouds into the larger environment, since there is a common basis that they are all converted to. In this example, the position according to these axes is referred to as the absolute position. In this example, these axes are relative to the takeoff location of the UAV. As a result, just before the UAV takes off, it is at absolute position <0,0,0> (in units of meters), and if it climbs 1 meter and moves forward 1 meter (without turning), it would be at absolute position <1,0,−1> (e.g., upwards is −Z in this example). The majority of the operations that follow are used to place the scene point clouds, which are only relative to the UAS at the position they were captured, into these absolute axes.

As discussed above, each of the points can be represented as a vector that encodes its position relative to the UAV at the moment that the point was captured. This vector can be given as:

$$p = \begin{bmatrix} p_x \\ p_y \\ p_z \end{bmatrix}$$

Each of these must be converted to a vector that represents its position relative to the base axes. The goal vector can be given as:

$$P = \begin{bmatrix} P_x \\ P_y \\ P_z \end{bmatrix}$$

To start, there is a vector p. Note that p represents the point's location in relation to the UAV, not to the base axes. The conversion process applies linear algebra, specifically the usage of matrices as linear transformations. The first step is translation.

Translation effectively moves the <x, y, z> relative axes of the UAV to share a common origin with the <X, Y, Z> absolute base axes. For example, knowing that:

$$\xi = \begin{bmatrix} x \\ y \\ z \end{bmatrix}$$

and $$p = \begin{bmatrix} p_x \\ p_y \\ p_z \end{bmatrix}$$

The goal is to shift p so that it can counteract the linear shift associated with the position of the UAV, ξ. This is accomplished with a matrix multiplication.

Construct a translation matrix T:

$$T = \begin{bmatrix} 1 & 0 & 0 & x \\ 0 & 1 & 0 & y \\ 0 & 0 & 1 & z \\ 0 & 0 & 0 & 1 \end{bmatrix}$$

Add a fourth element, 1, to p. This helps in the next step. Call this $p_h$ (e.g., "h" for "homogeneous" coordinates). Multiply $p_h$ by T:

$$T = \begin{bmatrix} 1 & 0 & 0 & x \\ 0 & 1 & 0 & y \\ 0 & 0 & 1 & z \\ 0 & 0 & 0 & 1 \end{bmatrix} \begin{bmatrix} p_x \\ p_y \\ p_z \\ 1 \end{bmatrix} = \begin{bmatrix} t_x \\ t_y \\ t_z \\ 1 \end{bmatrix}$$

Then remove the extraneous 1 from the resultant vector, to get a translated point location, t:

$$t = \begin{bmatrix} t_x \\ t_y \\ t_z \end{bmatrix}$$

This represents the location of the point when the position of the UAV is accounted for, but not the orientation. To determine the rotation, the quaternion representation of the orientation of the UAV (q) is converted into a roll-pitch-yaw representation η. The quaternion q represents a rotation angle, $q_0$, about a rotation axis vector, <$q_1$, $q_2$, $q_3$>. This is contrasted with the roll-pitch-yaw representation, which represents the orientation as three angles (e.g., rotations around x,y,z axes). The formulae for conversion from quaternion to roll-pitch-yaw can be given as:

$$\phi = \tan^{-1}\left(\frac{q_0 q_1 + q_2 q_3}{q_0^2 - q_1^2 - q_2^2 + q_3^2}\right)$$

$$\theta = -\sin^{-1}(2(q_1 q_3 - q_0 q_2))$$

$$\psi = \tan^{-1}\left(\frac{2(q_0 q_3 + q_1 q_2)}{q_0^2 + q_1^2 - q_2^2 - q_3^2}\right)$$

This is what is known as an "intrinsic rotation", which means that the rotations are done with respect to the axes of the UAV, not the absolute axes. When a rotation is performed about one axis, the other two axes move. Therefore, the second rotation takes place around an axis that is not where it started. As a result, the order of rotation matters. In this example, the rotation transformation happens in reverse order: yaw, then pitch, then roll (e.g., $\psi$, then $\theta$, then $\phi$). The derived formulae are unique to this order of rotations.

The orientation is now in the desired format, and t, the translated position of the point, has been calculated. The rotation of the point in 3D space is performed. A rotation matrix R is constructed. In this example, R is derived to be as follows (e.g., based on matrix multiplication of the three component rotations):

$$R = \begin{bmatrix} \cos\psi\cos\theta & \cos\psi\sin\theta\sin\phi - \sin\psi\cos\phi & \cos\psi\sin\theta\cos\phi + \sin\psi\cos\phi \\ \sin\psi\cos\theta & \sin\psi\sin\theta\sin\phi + \cos\psi\cos\phi & \sin\psi\sin\theta\cos\phi - \cos\psi\sin\phi \\ -\sin\theta & \cos\theta\sin\phi & \cos\theta\cos\phi \end{bmatrix}$$

Multiply the translated point t by R. This will give the goal point, P:

$$P = Rt = \begin{bmatrix} \cos\psi\cos\theta & \cos\psi\sin\theta\sin\phi - \sin\psi\cos\phi & \cos\psi\sin\theta\cos\phi + \sin\psi\cos\phi \\ \sin\psi\cos\theta & \sin\psi\sin\theta\sin\phi + \cos\psi\cos\phi & \sin\psi\sin\theta\cos\phi - \cos\psi\sin\phi \\ -\sin\theta & \cos\theta\sin\phi & \cos\theta\cos\phi \end{bmatrix}$$

$$\begin{bmatrix} t_x \\ t_y \\ t_z \end{bmatrix} = \begin{bmatrix} P_x \\ P_y \\ P_z \end{bmatrix}$$

This is the result being sought: a point with respect to the absolute base axes. The color or other image data is then assigned to the point, and the result is a representation of a point in the right place in 3D space, with the captured color of that point. This process is repeated for the other points. Since each scene point cloud is generally captured from a different pose, each one has its own associated T and R matrices.

In operation, the UAV streams the point data (<x, y, z> and <R, G, B>) to the remote workstation 103. In some implementations, the stream can look like:

x,y,z,R,G,B/x,y,z,R,G,B/x,y,z,R,G,B/ . . .

A process operating on the remote workstation 103 converts the point data into a standard file format, such as an .ASC file (e.g., plain text) or an XML file. In the example of a plain text file, the point data can be represented as a collection of lines of text, each of which corresponds to a point from the cloud:

x y z R G B
x y z R G B
x y z R G B
. . .

The resulting file can be provided to software that can interpret the 3D model data and provide a visual rendering of the 3D model. One such software package is on open-source software application called "MeshLab" (http://www.meshlab.net/), which is capable of reading the .ASC file and render it so that it can be seen as a point cloud on a display screen. The software converts the data from millions of lines of six numbers into a form that is easily interpretable by humans.

Figure 8:
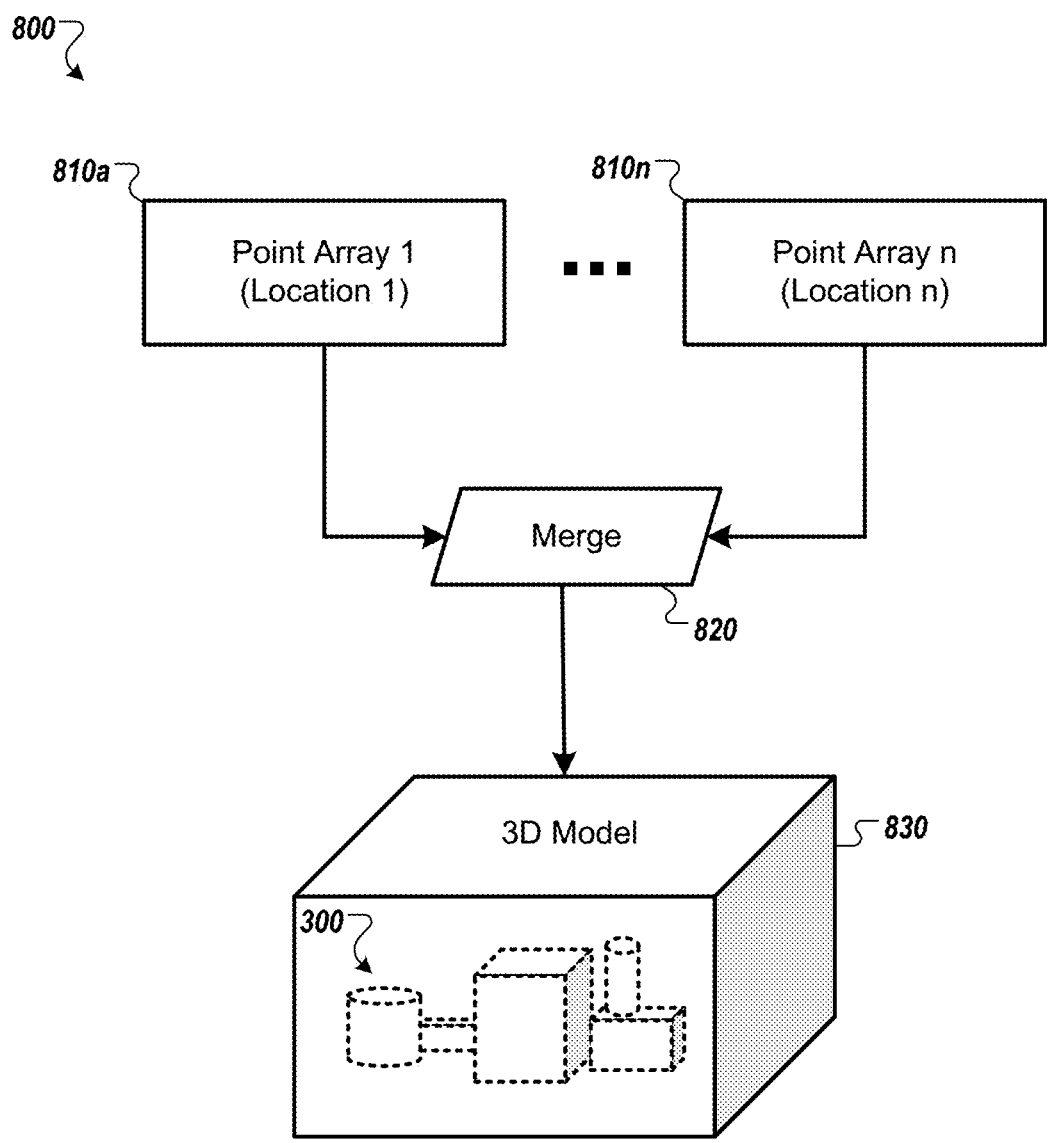
FIG. 8 shows a conceptual example of data operations for expanding an example three-dimensional model.

FIG. 8 shows a conceptual example of data operations 800 for expanding an example three-dimensional model. In the example operations 700, a single point map (e.g., point map 730) is used to model the scene 310b. In general, this process can be repeated to expand the model with additional data points.

In the illustrated example, a collection of point arrays 810a-810n are collected. For example, the point array 810a can be the example point array 730 of FIG. 7, and the point arrays 810b-810n can be additional point arrays taken by the same UAV or multiple UAVs from different points of view.

The point arrays 810a-810n can be combined in a merge process 820. The merge process 820 applies one or more techniques for matching points in absolute space. For example, the point arrays 810a-810n can be compared to identify similarities that represent overlap between two or more UAV perspectives, and/or images of the same object(s) but captured from two or more UAV orientations, and the relative positioning of the point arrays 810a-810n can be determined relative to each other in order to be assembled into a common 3D array.

In another example, the point arrays 810a-810n can be augmented with positional information obtained from the UAV's flight systems at the time an image is captured. Each point array 810a-810n can be a partial point cloud captured at a different position and orientation, each of which can be estimated based on UAV flight sensor information. Thus, each of the point arrays 810a-810n can be transformed using a matrix that takes into account the position and orientation of the UAV at the time of capture. By applying this linear transformation, which is unique to each cloud, the point arrays 810a-810n can be placed relative to a common coordinate system. The resulting 3D data can then be visualized or otherwise presented as a 3D model 830. This process allows large point clouds to be constructed as a map of the entire environment.

Figure 9:
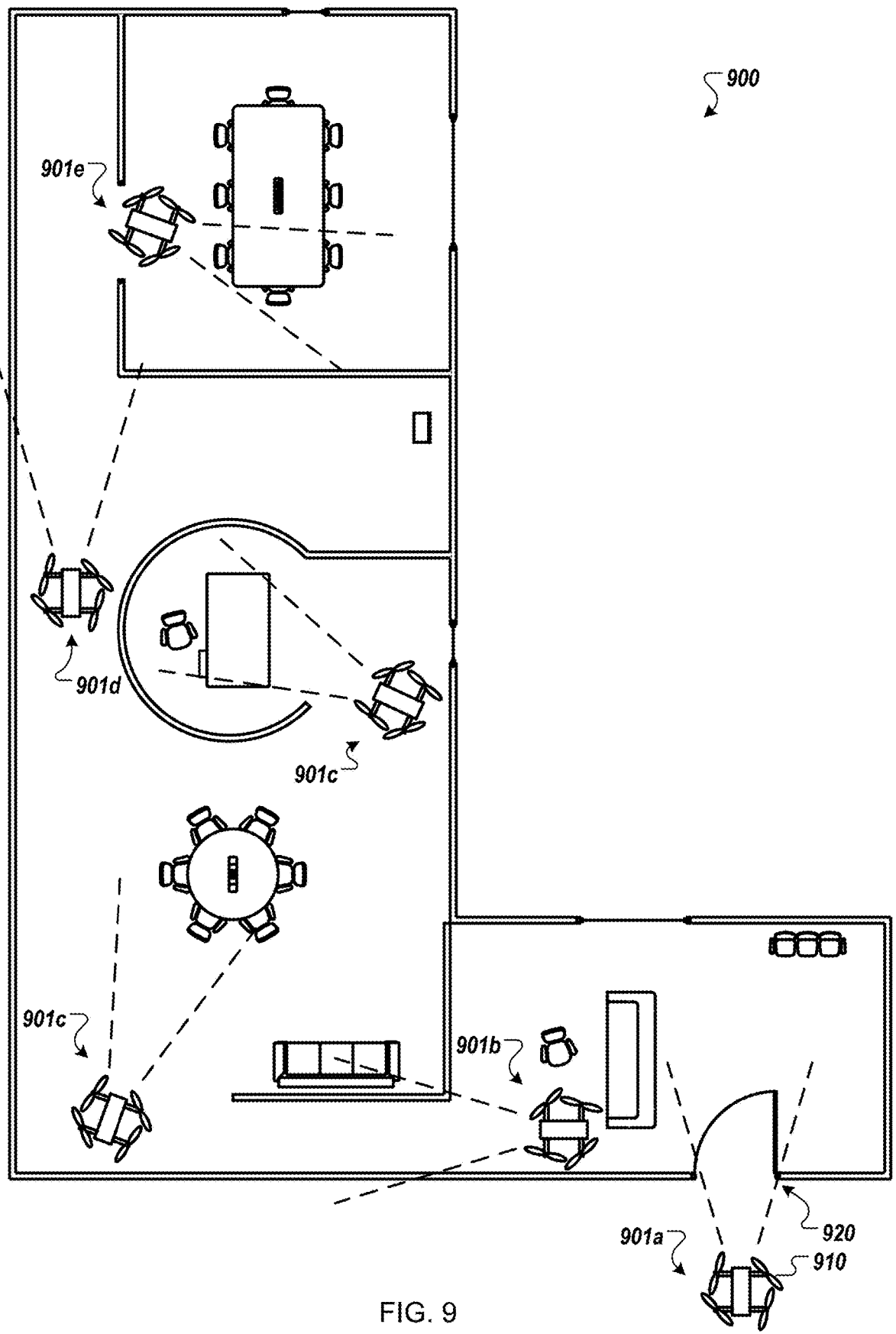
FIG. 9 shows an example floor plan of a space and example unmanned aerial vehicles operating within the space.

FIG. 9 shows an example floor plan of a space 900 and example UAV operations within the space 900. A UAV 910 is launched from a starting location 901a. In some implementations, the location 901a may be designated as a "home" location (e.g., for an autonomous return flight). In some implementations, the location 901a may be used as a point of origin for the 3D model that will be built based on the UAV 910 operations. For example, the location 901a may be identified as having a 3D position of X=0, Y=0, and Z=0, and an orientation of PITCH=0, YAW=0, and ROLL=0. In another example, the location 901a may be identified based on absolute position (e.g., GPS coordinates, compass heading, and sensed tilt angles).

In the illustrated example, the UAV 910 scans the area in front of the location 910, which includes a door 920. Information from that scan is processed (e.g., as described elsewhere in this document) and added to a database of 3D information that includes the 3D locations of objects in its view but also image (e.g., color) information about those 3D objects. In the illustrated example, a colorized 3D model of the door 920 could be rendered based on the UAV observations at the location 901a.

Continuing the illustrated example, the UAV 910 can be flown through the door 920 to a location 901b. In some implementations, the flight path of the UAV 910 can be determined at least partly based on the 3D information collected at the location 901a. For example, the 3D size and location of the door 920 can be determined, and a flight path can be plotted to take the UAV 910 thought the door 920 with the least possibility for a collision (e.g., through the middle of the opening rather than near the door frame).

At various points along the flight path from the location 901a to 901b, the UAV 910 performs image capture and range measurement operations. Pairs of such images are compared, and the range measurements are combined with them to determine portions of a 3D model of the space 900. As additional information is collected, the 3D model is expanded. The collection process continues at and between additional locations 901b-901e to build up a colorized or otherwise (e.g., infrared) visually representative 3D model of the space 900.

In some implementations, a single UAV can be used. For example, the UAV 910 can be flown to the various locations 901a-901e to collect information. In some implementations, multiple UAV (e.g., a "swarm") can be used. For example, five UAVs similar to the UAV 910 can be flown to the locations 901a-901e to collect information at substantially the same time. In some embodiments of swarms, each UAV may report its information directly (e.g., star topology) to a remote, central workstation, and the workstation can be configured to assemble the information from multiple UAVs into a common 3D model. In some embodiments of swarms, the UAVs may be in communication with each other (e.g., mesh topology), in which each UAV can act not only as an information gathering device, but also as a repeater that can extend and/or improve the reach of communications to a remote workstation. For example, the location 901e may be out of direct communications range from the location 901a, but locations 901b-901e for mesh-enabled UAVs can be at least partly determined to ensure that each UAV is within communications range of at least one other UAV. In such an example, the UAV at 901c may act as a repeater for communications between a UAV at location 901a and location 901e. If the UAV at 901c is disabled, the UAV at location 901d may automatically take over the role as repeater to reconfigure the logical topology of the mesh network, and/or the UAV at location 901b may be automatically repositioned (e.g., within range of locations 901a and 901e) to reconfigure the physical topology of the mesh network.

In some implementations, the locations 901a-901e can be determined at least partly based on information collected about others of the locations 901a-901e. For example, from the perspective of 901a, the door 920 and the space beyond it can be seen. 3D point image and range information about the shape and color of the door 920 can be gathered based on this vantage point. The robust information collected about the door 920 is considered to be "point dense". Observable objects beyond the door have less resolution due to their distance, and objects to the sides of the door 920 cannot be observed. The sparse of nonexistent information collected about the background and hidden objects is considered to be "point scarce". The relative point density and/or scarcity of the collected information can then be used to manually, semi-autonomously, or autonomously guide UAVs to "point scarce" locations in order to collect more information to increase the point density, and therefore the fidelity, of the 3D model in those locations. This process can continue or be repeated until a predetermined point density level is achieved.

Figure 10:
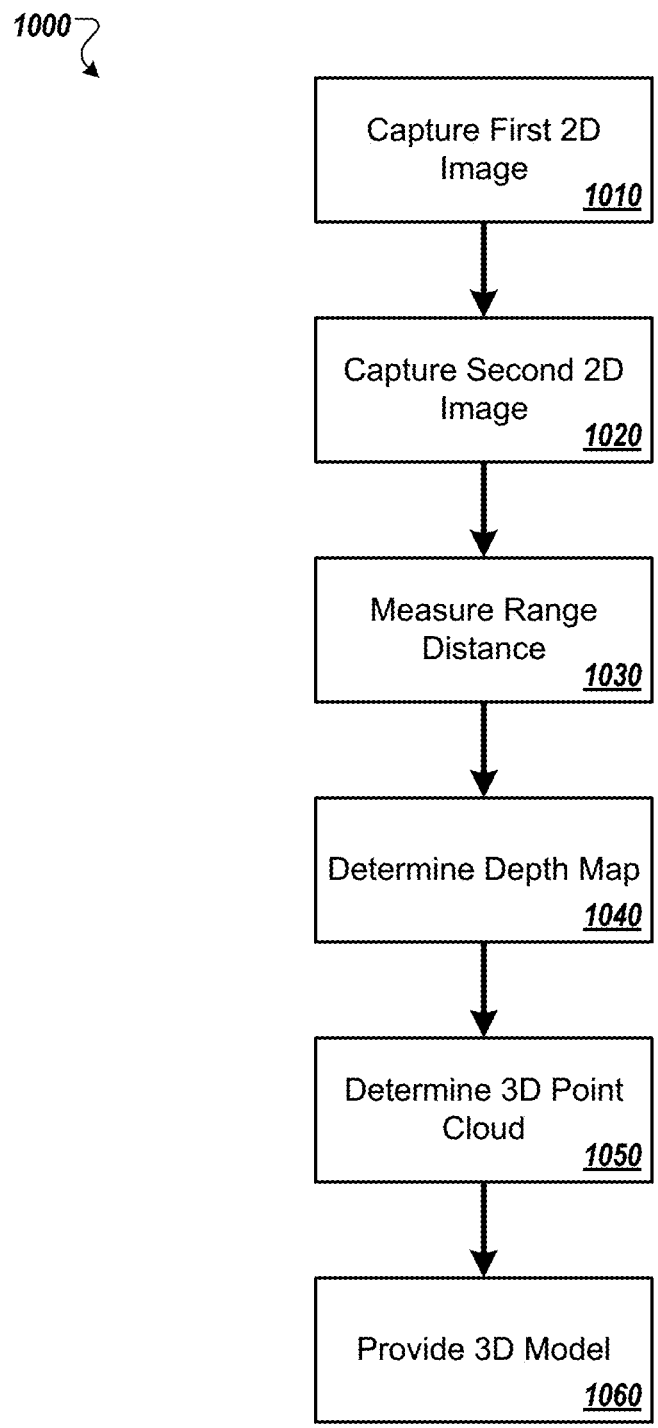
FIG. 10 is a flow diagram of an example process for mapping a three dimensional environment.

FIG. 10 is a flow diagram of an example process 1000 for mapping a three dimensional environment. In some implementations, the process 1000 can be performed by all of part of the example UAS 100 or the example UAV 101 of FIG. 1, the example UAV 200 of FIGS. 2-4, or the example UAV 910 of FIG. 9. In some implementations, the process 1000 can be all or some of the example processes discussed in the descriptions of FIGS. 5-8.

At 1010, a two-dimensional first image of a three-dimensional scene is captured at a first location. In some implementations, capturing the first two-dimensional image can include capturing, by an image sensor positioned at the first location by an unmanned aerial system (UAS), the first two-dimensional image. For example, the UAV 200 can capture an image of the 3D environment 300 at a first location, as shown in FIG. 3.

At 1020, a two-dimensional second image of the three-dimensional scene is captured at a second location. In some implementations, capturing the second two-dimensional image can include capturing, by the image sensor positioned at the second location by the UAS, the second two-dimensional image. For example, the UAV 200 can capture an image of the 3D environment 300 at a location that is offset from the first location, as shown in FIG. 4.

At 1030, a range distance is measured from at least one of the first location and the second location to a closest object in the scene. In some implementations, measuring the range distance can include measuring, by a range sensor positioned by the UAS, the range distance. For example, the UAV 200 can measure the distance from the UAV 200 to the objects 301a-301c, as shown in FIG. 4.

At 1040, a depth map is determined based on differences between the first image and the second image. For example, the example depth map 610 of FIG. 6 can be determined from the difference map 630 determined from the first image 510a and the second image 501b.

At 1050, a three-dimensional point cloud is determined based on the range distance, the depth map, and at least one of the first image and the second image. For example, the example point array 630 (e.g., point cloud) of FIG. 7 can be determined based on the range measurement 520 of FIGS. 5 and 6, the depth map 610, and the image 510b.

At 1060, the three-dimensional point cloud is provided as a three-dimensional model of the three-dimensional scene. For example, the example 3D model 710 of FIG. 7 can be provided as a 3D pseudo-3D representation on a computer display (e.g., the workstation 102) of the scene 310b. The representation can be viewed and/or manipulated by a user, such as to remotely preview the 3D environment 300 of FIGS. 3-4, and/or to plot flight paths for the UAV 910 in the example of FIG. 9.

In some implementations, the process 900 can also include capturing, at a third location, a two-dimensional third image of the three-dimensional scene, a second range distance can be measured between the third location and another closest object in the scene, a second depth map can be determined based on differences between the third image and one of the first image and the second image, a second three-dimensional point cloud can be determined based on the second range distance, the second depth map, and the third image, and the three-dimensional model can be expanded based on the second three-dimensional point cloud. For example, the UAV 200 may offset to another vantage point different from the positions shown in FIGS. 3 and 4, and a third image of the 3D environment 300 can be captured and another range measurement can be taken. This third image can be compared to a previous image (e.g., the second image 510*b*) to determine another point array, such as the example point array 810*n* of FIG. 8. The point array 810*n* can be merged (e.g., 820) with previous point arrays (e.g., point arrays 810*a*-810$_{n-1}$ to expand the 3D model 830.

In some implementation, capturing the first two-dimensional image can include capturing, by a first image sensor positioned at the first location by a first unmanned aerial system (UAS), the first two-dimensional image, capturing the second two-dimensional image can include capturing, by a second image sensor positioned at the second location by a second UAS, the second two-dimensional image, and measuring the range distance can include measuring, by a range sensor positioned by the first UAS or the second UAS, the range distance. For example, in FIG. 3, the scene 310*a* can be captured by the UAV 200, and in FIG. 4, the scene 310*b* can be captured by a different UAV or UAS working in cooperation (e.g., swarm) with the UAV 200.

In some implementations, determining a three-dimensional point cloud can include determining a two-dimensional collection of difference values by comparing the first image and the second image, grouping the difference values into subsets of points having similar difference values, identifying a subset from the grouped subsets, associating the range depth with the identified subset, determining depths of other subsets of points based on an extrapolation of the depth, the difference values of the identified subset, and the difference values of the other subsets, and creating the three-dimensional point cloud based on the determined depths. For example, the values of the depth map 610 can be grouped based on their relative distance, and such groupings may be treated as a continuous surface since their similar values may suggest that the groupings represent a single object or a continuous grouping of objects at the same distance from the UAV.

In some implementations, for one or more difference values in the collection of depths, the difference value can be selected, the two-dimensional location of the selected difference value can be determined, a two-dimensional location in least one of the first image and the second image that corresponds to the determined two-dimensional location can be identified, one or more image characteristics of the identified location can be identified in which the image characteristics can selected from a group including color values and luminance values, the identified image characteristic and the selected difference value can be associated with the determined two-dimensional location, wherein creating the three-dimensional point cloud based on the determined depths is further based on the image characteristics and the selected difference values associated with the determined two-dimensional locations, such that one or more points of the point cloud each have a three dimensional position and one or more image characteristics. For example, as discussed in the description of FIG. 7, the depth values from the depth map 610 can be merged (720) with color (and/or luminance) values from corresponding pixels of the second image 510*b* to create a colorized depth map such as the point array 730.

In some implementations, the process 1000 can also include determining a flight path based on the three-dimensional model, and navigating an unmanned aerial system based on the determined flight path. In some implementations, the process 1000 can also include identifying a portion of the three-dimensional point cloud having a relatively lower point density than other portions of the three-dimensional point cloud, and identifying a three-dimensional location based on the identified portion, wherein the flight path includes the identified three-dimensional location. For example, the UAV 910 can collect information from the space 900 to recreate at least a partial 3D model of the space 900, and the partial model can be used to determine a flight path for the UAV 910 through the space 900, for example, to fly safely around obstacles in the space 900 and/or to explore areas of low point density in order to expand and improve the resolution of the 3D model.

In some implementations, the process 1000 can also include capturing, at the identified three-dimensional location, a two-dimensional third image of the three-dimensional scene, measuring a second range distance between the identified three-dimensional location and another closest object in the scene, determining a second depth map based on differences between the third image and one of the first image and the second image, determining a second three-dimensional point cloud based on the second range distance, the second depth map, and the third image, and increasing the point density of the three-dimensional point cloud based on the second three-dimensional point cloud. For example, the UAV 910 can collect information from the space 900 to recreate at least a partial 3D model of the space 900, and the partial model can be used to determine a flight path for the UAV 910 through the space 900, to explore areas of low point density. Additional images and distance measurements taken at the explored locations can be compared to and merged with previously collected information in order to expand and improve the resolution of the 3D model.

Figure 11:
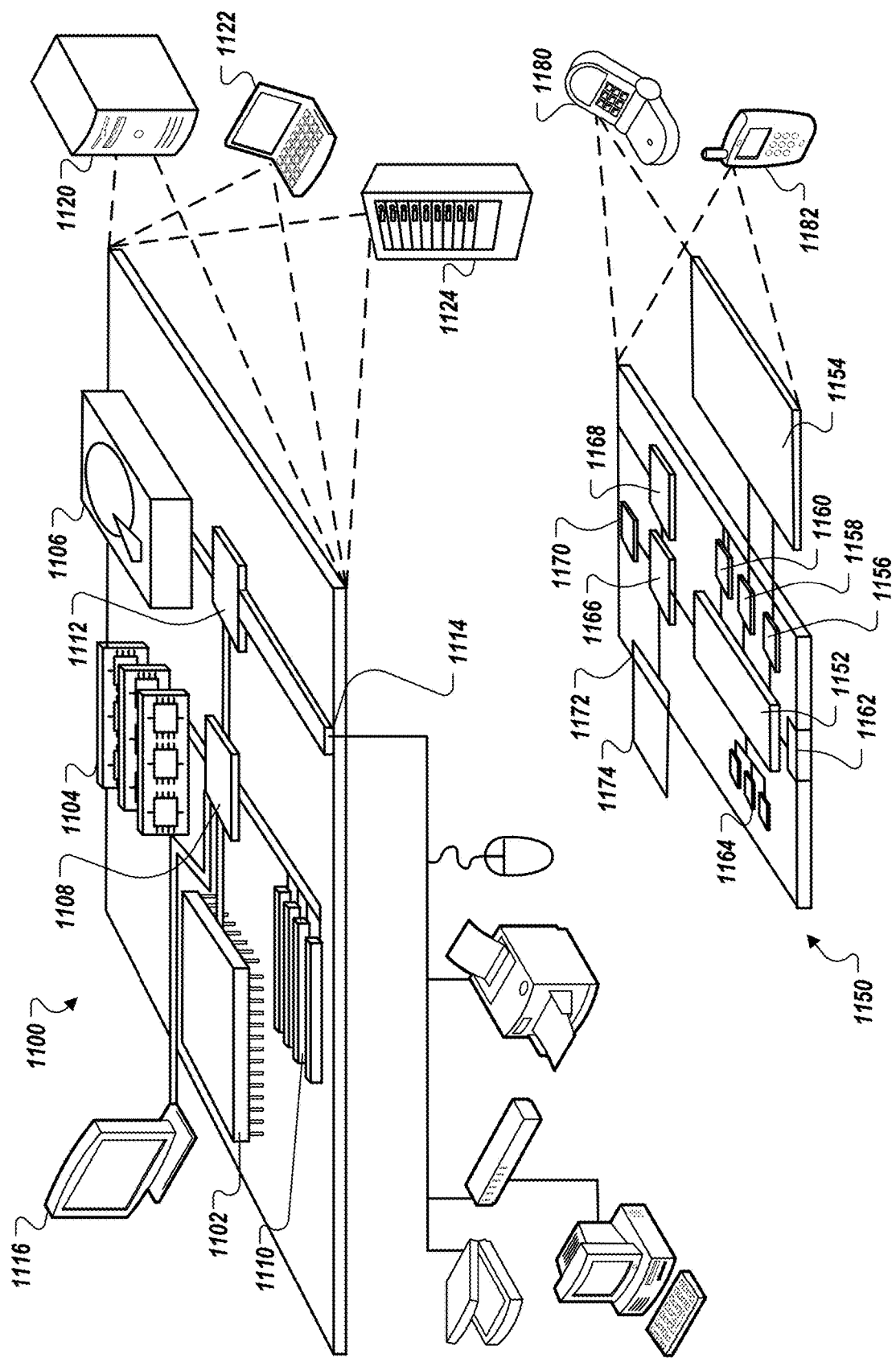
FIG. 11 is a block diagram of computing devices.

FIG. 11 is a block diagram of computing devices 1100, 1150 that may be used to implement the systems and methods described in this document, either as a client or as a server or plurality of servers. Computing device 1100 is intended to represent various forms of digital computers, such as laptops, desktops, workstations, personal digital assistants, servers, blade servers, mainframes, and other appropriate computers. Computing device 1150 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1100 includes a processor 1102, memory 1104, a storage device 1106, a high-speed interface 1108 connecting to memory 1104 and high-speed expansion ports 1110, and a low speed interface 1112 connecting to low speed bus 1114 and storage device 1106. Each of the components 1102, 1104, 1106, 1108, 1110, and 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as display 1116 coupled to high speed interface 1108. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a computer-readable medium. In one implementation, the memory 1104 is a volatile memory unit or units. In another implementation, the memory 1104 is a non-volatile memory unit or units.

The storage device 1106 is capable of providing mass storage for the computing device 1100. In one implementation, the storage device 1106 is a computer-readable medium. In various different implementations, the storage device 1106 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 1104, the storage device 1106, or memory on processor 1102.

The high speed controller 1108 manages bandwidth-intensive operations for the computing device 1100, while the low speed controller 1112 manages lower bandwidth-intensive operations. Such allocation of duties is exemplary only. In one implementation, the high-speed controller 1108 is coupled to memory 1104, display 1116 (e.g., through a graphics processor or accelerator), and to high-speed expansion ports 1110, which may accept various expansion cards (not shown). In the implementation, low-speed controller 1112 is coupled to storage device 1106 and low-speed expansion port 1114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. It may also be implemented as part of a rack server system 1124. In addition, it may be implemented in a personal computer such as a laptop computer 1122. Alternatively, components from computing device 1100 may be combined with other components in a mobile device (not shown), such as device 1150. Each of such devices may contain one or more of computing device 1100, 1150, and an entire system may be made up of multiple computing devices 1100, 1150 communicating with each other.

Computing device 1150 includes a processor 1152, memory 1164, an input/output device such as a display 1154, a communication interface 1166, and a transceiver 1168, among other components. The device 1150 may also be provided with a storage device, such as a microdrive or other device, to provide additional storage. Each of the components 1150, 1152, 1164, 1154, 1166, and 1168, are interconnected using various buses, and several of the components may be mounted on a common motherboard or in other manners as appropriate.

The processor 1152 can process instructions for execution within the computing device 1150, including instructions stored in the memory 1164. The processor may also include separate analog and digital processors. The processor may provide, for example, for coordination of the other components of the device 1150, such as control of user interfaces, applications run by device 1150, and wireless communication by device 1150.

Processor 1152 may communicate with a user through control interface 1158 and display interface 1156 coupled to a display 1154. The display 1154 may be, for example, a TFT LCD display or an OLED display, or other appropriate display technology. The display interface 1156 may include appropriate circuitry for driving the display 1154 to present graphical and other information to a user. The control interface 1158 may receive commands from a user and convert them for submission to the processor 1152. In addition, an external interface 1162 may be provide in communication with processor 1152, so as to enable near area communication of device 1150 with other devices. External interface 1162 may provide, for example, for wired communication (e.g., via a docking procedure) or for wireless communication (e.g., via Bluetooth or other such technologies).

The memory 1164 stores information within the computing device 1150. In one implementation, the memory 1164 is a computer-readable medium. In one implementation, the memory 1164 is a volatile memory unit or units. In another implementation, the memory 1164 is a non-volatile memory unit or units. Expansion memory 1174 may also be provided and connected to device 1150 through expansion interface 1172, which may include, for example, a SIMM card interface. Such expansion memory 1174 may provide extra storage space for device 1150, or may also store applications or other information for device 1150. Specifically, expansion memory 1174 may include instructions to carry out or supplement the processes described above, and may include secure information also. Thus, for example, expansion memory 1174 may be provide as a security module for device 1150, and may be programmed with instructions that permit secure use of device 1150. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1164, expansion memory 1174, or memory on processor 1152.

Device 1150 may communicate wirelessly through communication interface 1166, which may include digital signal processing circuitry where necessary. Communication interface 1166 may provide for communications under various modes or protocols, such as GSM voice calls, Voice Over LTE (VOLTE) calls, SMS, EMS, or MMS messaging, CDMA, TDMA, PDC, WCDMA, CDMA2000, GPRS, WiMAX, LTE, among others. Such communication may occur, for example, through radio-frequency transceiver 1168. In addition, short-range communication may occur, such as using a Bluetooth, WiFi, or other such transceiver (not shown). In addition, GPS receiver module 1170 may provide additional wireless data to device 1150, which may be used as appropriate by applications running on device 1150.

Device 1150 may also communication audibly using audio codec 1160, which may receive spoken information from a user and convert it to usable digital information. Audio codex 1160 may likewise generate audible sound for a user, such as through a speaker, e.g., in a handset of device 1150. Such sound may include sound from voice telephone calls, may include recorded sound (e.g., voice messages, music files, etc.) and may also include sound generated by applications operating on device 1150.

The computing device 1150 may be implemented in a number of different forms, as shown in the figure. For example, it may be implemented as a cellular telephone 1180. It may also be implemented as part of a smartphone 1182, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A computer-implemented method for creating three-dimensional models, comprising:
    capturing, by one or more image sensors positioned at a first location, a two-dimensional first image of a three-dimensional scene of a target location that is different from the first location;
    capturing, by the one or more image sensors positioned at a second location, a two-dimensional second image of the three-dimensional scene of the target location;
    measuring, by a range sensor positioned at the first location or at the second location, a range distance from at least one of the first location and the second location to a closest object in the three-dimensional scene of the target location;
    determining a depth map based on differences between the first image and the second image;
    determining a two-dimensional collection of difference values by comparing the first image and the second image;
    grouping the difference values into subsets of points having similar difference values;
    identifying a subset from the grouped subsets;
    associating the measured range distance with the identified subset;
    determining depths of other subsets of points based on an extrapolation of the measured range distance, the difference values of the identified subset, and the difference values of the other subsets; and
    determining a three-dimensional point cloud based on the determined depths;
    providing the three-dimensional point cloud as a three-dimensional model of the three-dimensional scene;
    identifying, by a processing system of an unmanned aerial system, a portion of the three-dimensional point cloud having a relatively lower point density than other portions of the three-dimensional point cloud;
    identifying, by the processing system, a three-dimensional location based on the identified portion;
    determining, by the processing system, a flight path based on the three-dimensional model, wherein the flight path includes the identified three-dimensional location; and
    navigating, by the processing system, the unmanned aerial system based on the determined flight path.

2. The method of claim 1, further comprising:
    capturing, by the one or more image sensors positioned at a third location, a two-dimensional third image of the three-dimensional scene of the target location;
    measuring, by the range sensor positioned at a third location, a second range distance between the third location and another closest object in the scene of the target location;

determining a second depth map based on differences between the third image and one of the first image and the second image;
determining a second three-dimensional point cloud based on the measured second range distance, the second depth map, and the third image; and
expanding the three-dimensional model based on the second three-dimensional point cloud.

3. The method of claim 1, wherein:
capturing the first two-dimensional image comprises capturing, by an image sensor of the one or more image sensors positioned at the first location by an unmanned aerial system (UAS), the first two-dimensional image;
capturing the second two-dimensional image comprises capturing, by the image sensor positioned at the second location by the UAS, the second two-dimensional image; and
measuring the range distance comprises measuring, by the range sensor positioned at the first location or at the second location by the UAS, the range distance.

4. The method of claim 1, wherein:
capturing the first two-dimensional image comprises capturing, by a first image sensor of the one or more image sensors positioned at the first location by a first unmanned aerial system (UAS), the first two-dimensional image;
capturing the second two-dimensional image comprises capturing, by a second image sensor of the one or more image sensors positioned at the second location by a second UAS, the second two-dimensional image; and
measuring the range distance comprises measuring, by the range sensor positioned by the first UAS at the first location or by the second UAS at the second location, the range distance.

5. The method of claim 1, further comprising:
for one or more difference values in the collection of distance values:
  selecting the difference value;
  determining the two-dimensional location of the selected difference value;
  identifying a two-dimensional location in least one of the first image and the second image that corresponds to the determined two-dimensional location;
  identifying one or more image characteristics of the identified location, wherein the image characteristics are selected from a group comprising color values and luminance values; and
  associating the identified image characteristic and the selected difference value with the determined two-dimensional location;
wherein creating the three-dimensional point cloud based on the determined depths is further based on the image characteristics and the selected difference values associated with the determined two-dimensional locations, such that one or more points of the point cloud each have a three dimensional position and one or more image characteristics.

6. The method of claim 1, further comprising:
capturing, by the one or more image sensors positioned at the identified three-dimensional location by the unmanned aerial system, a two-dimensional third image of the three-dimensional scene;
measuring, by the range sensor positioned at the identified three-dimensional location by the unmanned aerial system, a second range distance between the identified three-dimensional location and another closest object in the scene;

determining, by the processing system, a second depth map based on differences between the third image and one of the first image and the second image;
determining, by the processing system, a second three-dimensional point cloud based on the measured second range distance, the second depth map, and the third image; and
increasing, by the processing system, the point density of the three-dimensional point cloud based on the second three-dimensional point cloud.

7. An unmanned aerial system (UAS) comprising:
a processing system;
an image sensor;
a range sensor;
a lifting system comprising one or more lifting mechanisms configured to be controlled by the processing system; and
a non-transitory computer-readable medium coupled to the processing system and having instructions stored thereon that, when executed by the processing system, cause the UAS to perform operations comprising:
  positioning, by the lifting system, the UAS to a three-dimensional first location;
  capturing, by the image sensor when the UAS is positioned at the first location, a two-dimensional first image of a three-dimensional scene of a target location that is different from the first location;
  positioning, by the lifting system, the UAS at a three-dimensional second location;
  capturing, by the image sensor when the UAS is positioned at the second location, a two-dimensional second image of the three-dimensional scene of the target location;
  measuring, based on range signals provided by the range sensor at the three-dimensional first location or at the three-dimensional second location, a range distance from at least one of the first location and the second location to a closest object in the scene of the target location;
  determining a depth map based on differences between the first image and the second image;
  determining a two-dimensional collection of difference values by comparing the first image and the second image;
grouping the difference values into subsets of points having similar difference values;
identifying a subset from the grouped subsets;
associating the measured range distance with the identified subset;
determining depths of other subsets of points based on an extrapolation of the measured range distance, the difference values of the identified subset, and the difference values of the other subsets; and
determining a three-dimensional point cloud based on the determined depths;
providing the three-dimensional point cloud as a three-dimensional model of the three-dimensional scene;
identifying a portion of the three-dimensional point cloud having a relatively lower point density than other portions of the three-dimensional point cloud;
identifying a three-dimensional location based on the identified portion;
determining a flight path based on the three-dimensional model, wherein the flight path includes the identified three-dimensional location; and
navigating the UAS based on the determined flight path.

8. The UAS of claim 7, the operations further comprising:
positioning, by the lifting system, the UAS to a three-dimensional third location;
capturing, by the image sensor when the UAS is positioned at the third location, a two-dimensional third image of the three-dimensional scene of the target location;
measuring, by the range sensor when the UAS is positioned at the third location, a second range distance between the third location and another closest object in the scene of the target location;
determining a second depth map based on differences between the third image and one of the first image and the second image;
determining a second three-dimensional point cloud based on the second range distance, the second depth map, and the third image; and
expanding the three-dimensional model based on the second three-dimensional point cloud.

9. The UAS of claim 7, the operations further comprising:
for one or more difference values in the collection of distance values:
selecting the difference value;
determining the two-dimensional location of the selected difference value;
identifying a two-dimensional location in least one of the first image and the second image that corresponds to the determined two-dimensional location;
identifying one or more image characteristics of the identified location, wherein the image characteristics are selected from a group comprising color values and luminance values; and
applying the identified image characteristic to the selected difference value;
wherein creating the three-dimensional point cloud based on the determined depths is further based on the image characteristics applied to the difference values, such that one or more points of the point cloud each have three dimensional position and one or more image characteristics.

10. The UAS of claim 7, the operations further comprising:
capturing, by the image sensor at the identified three-dimensional location, a two-dimensional third image of the three-dimensional scene;
measuring, based on second range signals provided by the range sensor, a second range distance between the identified three-dimensional location and another closest object in the scene;
determining a second depth map based on differences between the third image and one of the first image and the second image;
determining a second three-dimensional point cloud based on the second range distance, the second depth map, and the third image; and
increasing the point density of the three-dimensional point cloud based on the second three-dimensional point cloud.

11. The UAS of claim 7, further comprising a communications transceiver, wherein the operations further comprise:
transmitting, by the communications transceiver, at least one of the first image, position information of the first location, the second image, position information of the second location, the range distance, the depth map, and the three dimensional point cloud to a computer system that is separate from the UAS; and
processing, by the computer system, at least one of the first image, position information of the first location, the second image, position information of the second location, the range distance, the depth map, and the three dimensional point cloud to determine the three-dimensional model.

12. The UAS of claim 11, the operations further comprising:
receiving, by the communications transceiver, the three-dimensional model;
determining, by the processing system, a flight path based on the received three-dimensional model; and
navigating, by the processing system, the UAS based on the determined flight path.

13. A system for creating full-color three-dimensional models, comprising:
a first unmanned aerial systems (UAS) and a second UAS, each UAS comprising:
a processing system;
an image sensor;
a range sensor;
a communications transceiver system;
a lifting system comprising one or more lifting mechanisms configured to be controlled by the processing system;
a non-transitory computer-readable medium coupled to the processing system and having instructions stored thereon that, when executed by the processing system, cause the first UAS to perform operations comprising:
positioning, by the lifting system, the first UAS to a three-dimensional first location;
capturing, by the image sensor when the UAS is positioned at the first location, a two-dimensional first image of a three-dimensional scene of a target location that is different from the first location;
transmitting, by the communications transceiver, the first image and information descriptive of the first location to the second UAS; and
cause the second UAS to perform operations comprising:
receiving, by the communications transceiver, the first image and information descriptive of the first location;
positioning, by the lifting system, the second UAS to a three-dimensional second location;
capturing, by the image sensor when the UAS is positioned at the second location, a two-dimensional second image of the three-dimensional scene of the target location;
measuring, based on range signals provided by the range sensor at the three-dimensional first location or at the three-dimensional second location, a range distance from the second location to a closest object in the scene of the target location;
determining a depth map based on differences between the first image and the second image;
determining a two-dimensional collection of difference values by comparing the first image and the second image;
grouping the difference values into subsets of points having similar difference values;
identifying a subset from the grouped subsets;
associating the measured range distance with the identified subset;
determining depths of other subsets of points based on an extrapolation of the measured range distance, the difference values of the identified subset, and the difference values of the other subsets; and determining a three-dimensional point cloud based on the determined depths;

providing the three-dimensional point cloud as a three-dimensional model of the three-dimensional scene;

identifying, by the processing system, a portion of the three-dimensional point cloud having a relatively lower point density than other portions of the three-dimensional point cloud;

identifying, by the processing system, a three-dimensional location based on the identified portion;

determining, by a processing system of an unmanned aerial system, a flight path based on the three-dimensional model, wherein the flight path includes the identified three-dimensional location; and navigating, by the processing system, the unmanned aerial system based on the determined flight path.

14. A system for creating full-color three-dimensional models, comprising:

at least one unmanned aerial system (UAS) comprising:
a first processing system;
an image sensor;
a range sensor;
a first communications transceiver system;
a lifting system comprising one or more lifting mechanisms configured to be controlled by the processing system;
a first non-transitory computer-readable medium coupled to the first processing system and having instructions stored thereon that, when executed by the first processing system, cause the UAS to perform first operations comprising:
positioning, by the lifting system, the UAS to three-dimensional locations;
capturing, by the image sensor when the UAS is positioned at the three-dimensional locations, two-dimensional images of a three-dimensional scene of a target location that is different from the three-dimensional locations;
measuring, based on range signals provided by the range sensor at one or more of the three-dimensional locations, range distances from the three-dimensional locations to closest objects in the scene of the target location; and
transmitting, by the first communications transceiver, the images, the range distances, and information descriptive of the three-dimensional locations; and a computing system comprising:
a second processing system;
a second communications transceiver system;
a second non-transitory computer-readable medium coupled to the second processing system and having instructions stored thereon that, when executed by the first processing system, cause the computer system to perform second operations comprising:
receiving, by the second communications transceiver, a first image and information descriptive of a first location of the three-dimensional locations;
receiving, by the second communications transceiver, a second image and information descriptive of a second location of the three dimensional locations;
receiving, by the second communications transceiver, a range distance from one of the first location and the second location to a closest object in the scene of the target location;
determining a depth map based on differences between the first image and the second image;
determining a two-dimensional collection of difference values by comparing the first image and the second image;
grouping the difference values into subsets of points having similar difference values;
identifying a subset from the grouped subsets;
associating the measured range distance with the identified subset;
determining depths of other subsets of points based on an extrapolation of the measured range distance, the difference values of the identified subset, and the difference values of the other subsets; and
determining a three-dimensional point cloud based on the determined depths; and
transmitting, by the second communication transceiver, the three-dimensional point cloud as a three-dimensional model of the three-dimensional scene;

wherein the first operations further comprise:
receiving, by the first communications transceiver system, the three-dimensional model;
identifying a portion of the three-dimensional point cloud having a relatively lower point density than other portions of the three-dimensional point cloud;
identifying a three-dimensional location based on the identified portion;
determining a flight path based on the three-dimensional model, wherein the flight path includes the identified three-dimensional location; and
navigating the UAS based on the determined flight path.

* * * * *

UNITED STATES PATENT AND TRADEMARK OFFICE
CERTIFICATE OF CORRECTION

Page 1 of 1

PATENT NO. : 11,127,202 B2
APPLICATION NO. : 16/113962
DATED : September 21, 2021
INVENTOR(S) : Parthiv Krishna It is certified that error appears in the above-identified patent and that said Letters Patent is hereby corrected as shown below:

On the Title Page

In Column 2 item (56), under Other Publications, please delete "Quadrocopter" and insert -- Quadcopter --, therefor.

In the Claims

Column 30, Line 15, in Claim 14, after "to" please delete "the".

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*